US012089683B2

(12) United States Patent
Yamada et al.

(10) Patent No.: US 12,089,683 B2
(45) Date of Patent: Sep. 17, 2024

(54) HEAD UP DISPLAY DEVICE AND HELMET

(71) Applicants: NS WEST Inc., Hiroshima (JP); SHOEI CO., LTD., Tokyo (JP)

(72) Inventors: Manabu Yamada, Shobara (JP); Masanori Hiramatsu, Shobara (JP); Kou Satou, Shobara (JP); Motoki Tashima, Shobara (JP); Naoya Matsuoka, Shobara (JP); Hirotaka Asaoka, Shobara (JP)

(73) Assignees: NS WEST Inc., Hiroshima (JP); SHOEI CO., LTD., Tokyo (JP)

( * ) Notice: Subject to any disclaimer, the term of this patent is extended or adjusted under 35 U.S.C. 154(b) by 631 days.

(21) Appl. No.: 17/350,149

(22) Filed: Jun. 17, 2021

(65) Prior Publication Data

US 2021/0307442 A1    Oct. 7, 2021

Related U.S. Application Data

(63) Continuation of application No. PCT/JP2019/049569, filed on Dec. 18, 2019.

(30) Foreign Application Priority Data

Dec. 20, 2018 (JP) .................................. 2018-238252
Dec. 20, 2018 (JP) .................................. 2018-238253
(Continued)

(51) Int. Cl.
*A42B 3/04*    (2006.01)
*A42B 3/22*    (2006.01)
(Continued)

(52) U.S. Cl.
CPC .............. *A42B 3/042* (2013.01); *A42B 3/224* (2013.01); *G02B 1/18* (2015.01); *G02B 27/0172* (2013.01);
(Continued)

(58) Field of Classification Search
CPC ........... A42B 3/00; A42B 3/003; A42B 3/004; A42B 3/042; A42B 3/044; A42B 3/224;
(Continued)

(56) References Cited

U.S. PATENT DOCUMENTS 5,537,092 A    7/1996  Suzuki et al.
9,696,552 B1 *  7/2017  Goergen ................... A42B 1/24
(Continued)

FOREIGN PATENT DOCUMENTS

CN    203502675 U    3/2014
CN    106569336 A    4/2017
(Continued)

OTHER PUBLICATIONS

International Search Report issued in PCT/JP2019/049569; mailed Feb. 25, 2020.

*Primary Examiner* — Sultan Chowdhury
(74) *Attorney, Agent, or Firm* — Studebaker & Brackett PC

(57) ABSTRACT

In an HUD device (3) mounted on a helmet (101), a projection unit (39) configured to project display light to a combiner (73) includes a light emitter (57) configured to emit display light, a housing (61) having a projection opening (63) through which display light emitted from the light emitter passes, and a cover member (65) having transparency to light and disposed to cover the projection opening. The projection unit (39) is incorporated in a chin portion (113) of the helmet body such that display light to be projected to the combiner passes through an optical path portion (119) provided in a mouse cover (115) of the helmet body (105). The cover member is disposed at an inner side of an interior member than a surface of the interior member at which an end of the optical path portion at a light emission side is open.

11 Claims, 15 Drawing Sheets

(30) Foreign Application Priority Data

| Dec. 20, 2018 | (JP) | 2018-238256 |
| Nov. 20, 2019 | (JP) | 2019-209471 |
| Nov. 20, 2019 | (JP) | 2019-209472 |

(51) Int. Cl.
  *G02B 1/18* (2015.01)
  *G02B 27/01* (2006.01)
  *G09G 5/10* (2006.01)
  *H04N 9/31* (2006.01)
  *B62J 50/22* (2020.01)

(52) U.S. Cl.
  CPC ............. *G09G 5/10* (2013.01); *H04N 9/3173* (2013.01); *B62J 50/22* (2020.02); *G09G 2360/141* (2013.01)

(58) Field of Classification Search
  CPC ...... A42B 3/227; G02B 27/01; G02B 27/017; G02B 27/0101; G02B 27/0172; G02B 27/0176; G02B 1/00; G02B 1/014; G02B 1/018; G02B 2027/0118; G09G 5/10; G09G 2360/141; B62J 50/22
  See application file for complete search history.

(56) References Cited

U.S. PATENT DOCUMENTS

| 2002/0101568 | A1 | 8/2002 | Eberl et al. | |
| 2010/0175160 | A1* | 7/2010 | Arnold | B29C 45/14336 |
| | | | | 425/129.1 |
| 2013/0135748 | A1 | 5/2013 | Sato et al. | |
| 2014/0172432 | A1 | 6/2014 | Sendai | |
| 2017/0032195 | A1 | 2/2017 | Gondo | |
| 2017/0102547 | A1* | 4/2017 | Wei | G02B 27/017 |
| 2017/0169612 | A1* | 6/2017 | Cashen | G06T 19/006 |
| 2017/0329139 | A1 | 11/2017 | Shearman et al. | |
| 2018/0249086 | A1 | 8/2018 | Ozawa et al. | |
| 2019/0255946 | A1* | 8/2019 | Takahashi | G02B 17/0668 |

FOREIGN PATENT DOCUMENTS

| CN | 106617455 A | 5/2017 |
| IN | 103069327 A | 4/2013 |
| JP | H06-885 U | 1/1994 |
| JP | H07-325265 A | 12/1995 |
| JP | 2000-284214 A | 10/2000 |
| JP | 2005-113326 A | 4/2005 |
| JP | 2010-019874 A | 1/2010 |
| JP | 2011-022210 A | 2/2011 |
| JP | 2011-175035 A | 9/2011 |
| JP | 2014-120963 A | 6/2014 |
| JP | 2017-030530 A | 2/2017 |
| JP | 2018-141824 A | 9/2018 |
| WO | 2016/022984 A1 | 2/2016 |

* cited by examiner

HEAD UP DISPLAY DEVICE AND HELMET

CROSS-REFERENCE TO RELATED APPLICATION

This is a continuation of PCT International Application PCT/JP2019/49569 filed on Dec. 18, 2019, which claims priority to Japanese Patent Applications No. 2018-238253 filed on Dec. 20, 2018, No. 2018-238256 filed on Dec. 20, 2018, No. 2018-238252 filed on Dec. 20, 2018, No. 2019-209471 filed on Nov. 20, 2019, and No. 2019-209472 filed on Nov. 20, 2019. The disclosures of these applications including the specifications, the drawings, and the claims are hereby incorporated by reference in their entirety.

BACKGROUND

The present disclosure relates to a head-up display device to be mounted on a helmet, and a helmet equipped with a head-up display device.

In a conventional technique, a head-up display device (hereinafter referred to as an "HUD device") is mounted on a helmet used in driving a motorcycle so that a user (driver) wearing the helmet can visually recognize various types of information, such as vehicle information including vehicle speed, map information obtained by a navigation system, and warning information, displayed as virtual images in a forward field of view of the user to thereby enhance convenience and safety in driving the motorcycle.

The HUD device mounted on the helmet includes a projection unit that projects display light in accordance with information to be displayed, and a combiner that reflects display light projected by the projection unit to an eye of the user who is a wearer of the helmet. The combiner is composed of a semitransparent mirror, is disposed at a position within the forward field of view of the user in a window opening formed in a front portion of the helmet, and allows light from the front of the user to pass through the combiner. Accordingly, the user can visually recognize a virtual image (display image) by display light with the virtual image superimposed on scenery through the combiner. An example of such an HUD device is described in Japanese Patent Application Publication No. 2017-030530.

SUMMARY

A projection unit constituting an HUD device includes, for example, a light emitter that emits display light and a housing that houses the light emitter. The housing has an opening through which display light passes. The opening is covered with a plate-shaped cover member having transparency to light. Such a projection unit is desirably incorporated in a helmet in order to reduce the size of the helmet equipped with the HUD device.

In the case where the projection unit is incorporated in the helmet, if the cover member is located at the outer surface of the helmet, the cover member is often taught by hands when the user uses the helmet, and thus, dirt or the like tends to be attached to the surface of the cover member. If dirt or the like is attached to the surface of the cover member, display light projected from the projection unit is blocked by the dirt on the surface of the cover member. This causes blurring (bleeding) in a display image displayed by the HUD device. Consequently, visual recognizability of a display image visually recognizable by the user through the combiner decreases.

In addition, a cover plate having transparency to light is provided to cover an opening of a housing. As the cover plate, a colorless transparent clear plate is preferably used in order to minimize dimming of display light projected from the projection unit.

Such a cover plate is disposed with a surface from which display light is emitted being oriented toward a window opening of the helmet in order to project display light toward the combiner. Thus, external light that has entered into the helmet through the window opening can be incident on the cover plate. The external light incident on the cover plate is reflected on the surface of the cover plate or temporarily passes through the cover plate and then is reflected inside the projection unit to a direction in which the external light passes through the cover plate again. At this time, the reflected external light is projected toward the face of the user efficiently with a small amount of light dimming because the cover plate is colorless and transparent and has a surface with a relatively high light reflection factor and a relatively high light transmittance.

The external light thus projected toward the face of a user efficiently is applied to the combiner or enters an eye of the user wearing the helmet. In the case where the external light is applied to the combiner, the outer surface and the inside of the projection unit are unintentionally reflected in the combiner. In the case where the external light enters an eye of the user, reflection of the external light might look dazzling. In either case, visual recognizability of a display image displayed by the HUD device is impaired.

In many motorcycle helmets widely available in the market, a transparent shield (visor) capable of covering a window opening is attached to a helmet body having the window opening in its front portion such that the shield is rotatable within a predetermined angle range, and the window opening is opened and closed by rotating the shield. The shield of such a helmet can be generally detachably attached to the helmet body, and is exchangeable to a shield having a different light transmittance for visual recognizability depending on brightness of external environments during driving of a motorcycle.

Examples of the shield of the helmet include, as well as a colorless transparent shield, a colored transparent shield such as a smoke-colored lightproof smoke shield, and a mirror shield having a reflecting appearance such as a mirror. For example, the smoke shield is used during the daytime with strong sunshine, whereas the colorless transparent shield is used in, for example, cloudy weather or night time. The smoke shields generally include various shields having different degrees of smoke color, such as soft smoke and dark smoke. The mirror shields include various shields with reflection surfaces of a variety of colors, such as blue and red.

In the HUD device as described above, the combiner is disposed inside the shield. However, without consideration of variations in brightness conditions of the field of view of a user caused by exchanging shields with different light transmittances, brightness of a display image seen through the combiner is adjusted in accordance with brightness of the outside of the helmet. Thus, visual recognizability of the display image might decrease in some cases by exchanging the shields.

For example, when the shield of the helmet is exchanged from a shield having a relatively high light transmittance such as a colorless transparent shield to a shield having a relatively low light transmittance such as a smoke shield, the field of view of the user becomes dark. Thus, if brightness of a display image visually recognizable by the user with the HUD device has been adjusted to relatively high, the display image looks dazzling, which might hinder driving.

In contrast, when the shield of the helmet is exchanged from a shield having a relatively low light transmittance to a shield having a relatively high light transmittance, the field of view of the user becomes blight. Thus, if brightness of a display image visually recognizable by the user with the HUD device has been adjusted to relatively low, the display image by obscured by external light and becomes hard to see. Brightness of a display image displayed by the HUD device at which the user feels easy for visually recognizing the display image varies from user to user.

To achieve the object, in a technique disclosed here, a projection unit is incorporated in a helmet, and a cover member disposed to cover an opening of a housing through which display light passes is located at a position at which a hand of a user does not easily touch the cover member in the projection unit.

Specifically, the technique disclosed here is directed to an HUD device mounted on a helmet.

An HUD device according to a technique disclosed here includes a projection unit configured to project display light to a projection target, the display light being used for forming a display image capable of being visually recognized as a virtual image by a user wearing the helmet through the projection target, the projection target being disposed in front of an eye of the user and having both light transmittance and light reflection. the projection unit includes a light emitter configured to emit display light, a housing having an opening through which display light emitted from the light emitter passes, and a cover member having transparency to light and disposed to cover the opening of the housing. The projection unit is incorporated in the helmet such that display light to be projected to the projection target through the cover member passes through a cylindrical optical path portion provided in an interior member. The cover member is disposed at an inner side of the interior member than a surface of the interior member at which an end of the optical path portion at a light emission side is open.

With this configuration, the cover member of the projection unit is disposed at the inner side of the interior member than the surface of the interior member at which the optical path portion is open. Thus, the user does not easily touch the cover member with a hand in using the helmet so that dirt on the hand of the user does not adhere to the surface of the cover member. Accordingly, blurring (bleeding) occurring in a display image displayed by the HUD device can be reduced so that visual recognizability of the display image can be thereby enhanced.

In the HUD device, the cover member is a plate-shaped object, and inclined in a direction in which a surface of the cover member from which display light is emitted faces outside of the helmet.

External light that has entered the inside of the helmet through the window opening of the helmet for providing a field of view to the user can enter the cylindrical optical path portion in the interior member in some cases. If the cover member is oriented to reflect external light that has entered the cylindrical optical path portion toward the inside of the window opening, external light reflected on the surface of the cover member might enter an eye of the user wearing the helmet so that the user can feel dazzling by reflection of the external light on the surface of the cover member. This impairs visual recognizability of a display image displayed by the HUD device and might hinder driving.

On the other hand, with the configuration described above, the surface of the cover member as a plate-shaped object from which display light is emitted is oriented toward the outside of the helmet. Thus, external light that has been applied to the inside of the helmet and entered the cylindrical optical path portion is not reflected on the surface of the cover member toward the outside of the helmet, and thereby, the external light is not reflected to an eye of the user wearing the helmet. Accordingly, visual recognizability of a display image displayed by the HUD device is not impaired and hindering of driving can be prevented.

The housing may be oriented with the opening through which display light passes facing upward. In this case, the optical path portion is preferably disposed above the cover member at a distance. Accordingly, the cover member is disposed with a gap interposed between the cover member and the optical path portion.

Foreign substances such as dust or moisture such as rainwater as well as external light applied to the inside of the helmet might enter the cylindrical optical path portion provided in the interior member. In particular, if the optical path portion extends in the top-bottom direction, foreign substances or moisture that has entered the optical path portion can adhere to the cover member located below the optical path portion. However, if the cover member is in contact with the lower end of the cylindrical optical path portion provided in the interior member, foreign substances or moisture that has entered the optical path portion is not escaped and thus accumulates on the surface of the cover member. When foreign substances accumulate on the surface of the cover member, the accumulated foreign substances block display light projected from the projection unit and, thereby, causes blurring (bleeding) in a display image, and when moisture adheres in granular form to the surface of the cover member, the moisture refracts display light projected from the projection unit and, thereby, causes distortion in the display image.

On the other hand, with the configuration described above, since the gap is provided between the cover member of the projection unit and the cylindrical optical path portion, even when foreign substances or moisture enters the cylindrical optical path portion from the opening of the upper end thereof, the foreign substances or moisture can be escaped to the outside through the gap between the cover member of the projection unit and the optical path portion. Accordingly, accumulation of foreign substances or moisture that has entered the cylindrical optical path portion on the surface of the cover member of the projection unit can be reduced, and even if the foreign substances or moisture adheres to the surface of the cover member, the amount of adhesion can be reduced. As a result, blurring (bleeding) of a display image displayed by the HUD device can be reduced so that visual recognizability of the display image can be thereby enhanced.

In the HUD device described above, the cover member preferably has a surface provided with a hydrophilic coating film.

The surface of the cover member of the projection unit can be fogged by moisture included in breath of a user wearing the helmet in some cases when the breath hits the surface of the cover member through the cylindrical optical path portion. In this case, if the surface of the cover member has water repellency, water adhered to the surface agglomerates to form minute droplets on the entire surface. When minute droplets are formed on the entire surface of the cover member, the surface of the cover member turns white as if the cover member is frosted glass and disperses display light projected from the projection unit. Consequently, a display image displayed by the HUD device becomes blurred.

On the other hand, in the configuration described above, since the surface of the cover member is provided with the hydrophilic coating film, even when breath of the user wearing the helmet hits the surface of the cover member and moisture included in the breach adheres to the surface of the cover member, the moisture is mixed in the surface of the cover member, and thus, minute droplets are hardly formed on the surface of the cover member. This can reduce blurring of a display image displayed by the HUD device so that visual recognizability of the display image can be thereby further enhanced.

The technique disclosed here is also directed to a helmet equipped with an HUD device.

A projection unit of an HUD device included in a helmet according to a technique disclosed here includes a housing having an opening through which display light emitted from a light emitter passes, and a cover member having transparency to light and configured to cover the opening of the housing. A cylindrical optical path portion is provided at a side of the housing having the opening. The projection unit is incorporated in the helmet such that display light to be projected to the projection target through the cover member passes through a cylindrical optical path portion provided in an interior member. The cover member is disposed at an inner side of the interior member than a surface of the interior member at which an end of the optical path portion at a light emission side is open.

With this configuration, the cover member of the projection unit is disposed at the inner side of the interior member than the surface of the interior member at which the optical path portion is open. Thus, the user does not easily touch the cover member with a hand in using the helmet so that dirt on the hand of the user does not adhere to the surface of the cover member. Accordingly, blurring (bleeding) occurring in a display image displayed by the HUD device can be reduced so that visual recognizability of the display image can be thereby enhanced.

In addition, since the opening through which display light of the projection unit passes is covered with the cover plate having a color with which a diming effect is obtained, the dimming effect of the cover plate reduces a reflection factor of external light on the surface of the cover plate and also reduces a transmittance of external light in the thickness direction of the cover plate. Accordingly, even when external light that has entered the inside through the window opening of the helmet is applied the cover plate, the external light is dimmed while being reflected on the surface of the cover plate or while passing through the cover plate in the thickness direction. Thus, intensity of external light reflected on the cover plate or inside the projection target becomes weak so that reflection in the outer surface of the projection unit or in the projection target therein can be reduced, and reflection of external light on the surface of the cover plate to an eye of the user can also be reduced. As a result, visual recognizability of a display image displayed by the HUD device can be enhanced.

In the HUD device, the color of the cover plate with which the dimming effect is obtained may be a smoke color. The "smoke color" herein is a dark color having transparency to light, such as black, gray, brown, blue, or indigo.

With this configuration, the smoke color is employed as a color of the cover plate, and thus, the dimming effect of the cover plate can be suitably obtained. In addition, a display image displayed by the HUD device is shown in a dark color such that the display image is not excessively conspicuous when being visually recognized while being superimposed on scenery through a projection target. As a result, usability of the HUD device can be enhanced.

In the HUD device, the light transmittance of the cover plate in the thickness direction is preferably less than or equal to 50%.

With this configuration, even when external light temporarily passes through the cover plate and is reflected to a direction in which the external light penetrates the cover plate again inside the projection unit to be reflected in the combiner, the external light can be made sufficiently darker than a display image displayed by the HUD device. Thus, visual recognizability of the display image is not impaired.

The technique disclosed here is directed to an HUD device to be mounted on a helmet including a helmet body having a window opening for providing a field of view to a user wearing the helmet, and a transparent shield configured to be exchangeably attached to the helmet body and to cover at least a portion of the window opening. The term "transparent" regarding the "shield" refers to the property of allowing visible light to pass therethrough (transparency), and includes translucent as well as colorless transparent. Examples of the "transparent shield" include, as well as a colorless transparent shield, a colored transparent shield such as a smoke shield and a mirror shield.

The HUD device according to the technique disclosed here includes: a combiner disposed inside a shield; a light emitter configured to emit display light to be projected to the combiner; and a control unit configured to control generation of display light in the light emitter. The control unit is linked to an operator, the operator being configured to receive an operation for adjusting brightness of a display image capable of being visually recognized as a virtual image by a user wearing the helmet through the combiner by projection of display light to the combiner, the control unit being configured to cause the light emitter to generate display light such that the display image has brightness adjusted by an operation of the operator.

With this configuration, the control unit is linked to the operator configured to receive an operation for adjusting brightness of a display image displayed by the HUD device, and causes the light emitter to generate display light such that a display image is formed to have brightness adjusted by the operation of the operator. Thus, brightness of the display image can be manually adjusted to a level at which the user can easily visually recognize the image, in accordance with light transmittance of the shield used when being attached to the helmet or a sense of visual recognizability varying among users. This can avoid a decrease in visual recognizability of a display image displayed by the HUD device caused by exchange of shields of the helmet.

The HUD device may further include an external light sensor disposed inside the shield and configured to detect brightness of external light. In this case, the control unit preferably causes the light emitter to generate display light such that brightness of a display image is adjusted in accordance with the brightness of external light detected by the external light sensor.

With this configuration, the external light sensor detects brightness of external light in the same space as environments visually recognized by the user inside the shield, and brightness of a display image is adjusted in accordance with the detected brightness of external light inside the shield. Thus, once brightness of the display image displayed by the HUD device has been temporality adjusted to a level at which the user can easily visually recognize the image by operation of the operator, the brightness of the display image can be automatically adjusted in accordance with a change in brightness of the outside of the helmet, and can be maintained in a state where the image can be easily visually recognized for a light/dark state of a field of view of the user.

The external light sensor is preferably disposed at the upper side in the top-bottom direction of a peripheral portion of the window opening of the helmet body in a posture in which brightness of external light incident through the window opening is detected.

In a case where the helmet equipped with the HUD device is configured such that the shield is attached to the helmet body to be rotatable within a predetermined angle range in the top-bottom direction so that the window opening is opened and closed by rotation of the shield, when the shield is lowered to completely close the window opening while it is humid or raining, moisture is kept in the helmet and the user might feel uncomfortable. In view of this, to ventilate the inside of the helmet while protecting the eyes of the user, the user can use the HUD device in a shield state where a lower portion of the window opening is made open and an upper portion is partially covered.

In the case of using the HUD device with the shield of the helmet being opened halfway as described above, if the external light sensor is oriented to detect brightness of external light entering through the window opening, the sensor detects brightness of external light from a portion of the window opening in which the shield is open (i.e., between the half-open shield and a peripheral portion of the window opening) in some cases depending on the position of the external light sensor such as a position at the lower side in the top-bottom direction of the peripheral portion of the window opening of the helmet body. Accordingly, the external light sensor fails to detect brightness of external light in the same space as environments visually recognized by the user inside the shield.

On the other hand, in the configuration described above, since the external light sensor is disposed at the upper side in the top-bottom direction of the peripheral portion of the window opening of the helmet body, even when the shield of the helmet is made open halfway, the light-receiving side of the external light sensor (a side provided with the light-receiving part receiving external light) is covered with the shield. Accordingly, even in a case where the HUD device is used with the shield being open halfway, brightness of external light in the same space as a visually recognized environments of the user can be detected by the external light sensor inside the shield.

In addition, the external light sensor is preferably disposed at a center in the top-bottom direction or near the center in the peripheral portion of the window opening of the helmet body in a posture in which brightness of external light incident through the window opening is detected.

In a case where the external light sensor is disposed in a posture in which the external light sensor detects brightness of external light entering through the window opening, the direction in which the external light sensor faces (i.e., direction in which the light-receiving part for receiving external light faces) intersects with a curved portion at the side of the shield at a relatively small angle, depending on the position of the external light sensor that is, for example, at the left or right end position in the left-right direction on a peripheral portion of the window opening of the helmet body. Thus, external light entering the shield from a direction except the front of the external light sensor can be relatively greatly refracted in a curved portion of the shield to be received by the external light sensor. As described above, the amount of light received by the external light sensor can be easily affected by the curved shape of the shield, and even inside the shield, brightness of external light different from brightness in environments visually recognized by the user might be detected by the external light sensor.

On the other hand, in the configuration described above, since the external light sensor is disposed at the center in the left-right direction or near the center on the peripheral portion of the window opening of the helmet body, the direction in which the external light sensor is oriented (i.e., direction in which the light-receiving part for receiving external light faces) intersects with the shield at a relatively large angle, and thus, external light entering the shield from a direction except the front of the external light sensor is not refracted in the curved portion of the shield and is not received by the external light sensor. Accordingly, the amount of light received by the external light sensor is not easily affected by the curved shape of the shield, and the external light sensor can detect brightness of external light substantially equal to brightness in environments visually recognized by the user inside the shield.

The technique disclosed here is directed to a helmet including: a helmet body having a window opening for providing a field of view to a user wearing the helmet; and a transparent shield configured to be exchangeably attached to the helmet body and to cover at least a portion of the window opening. The helmet is equipped with an HUD device that displays visual information to the user wearing the helmet body.

In the helmet according to the technique disclosed here, the HUD device includes a combiner disposed inside the shield, a light emitter configured to emit display light to be projected to the combiner, and a control unit configured to control generation of display light in the light emitter. The control unit is linked to an operator, the operator being configured to receive an operation for adjusting brightness of a display image capable of being visually recognized as a virtual image by a user wearing the helmet through the combiner by projection of display light to the combiner, the control unit being configured to cause the light emitter to generate display light such that the display image has brightness adjusted by an operation of the operator.

With this configuration, the control unit is linked to the operator configured to receive an operation for adjusting brightness of a display image displayed by the HUD device, and causes the light emitter to generate display light such that a display image is formed to have brightness adjusted by the operation of the operator. Thus, brightness of the display image can be manually adjusted to a level at which the user can easily visually recognize the image, in accordance with light transmittance of the shield used when being attached to the helmet or a sense of visual recognizability varying among users. This can avoid a decrease in visual recognizability of a display image displayed by the HUD device caused by exchange of shields of the helmet.

The HUD device and the helmet according to the technique of the present disclosure can reduce blurring (bleeding) of a display image visually recognizable by a user as a virtual image through a projection target, and enhance visual recognizability of the display image.

DETAILED DESCRIPTION

An exemplary embodiment will be described in detail hereinafter with reference to the drawings. In the following embodiment, in a helmet and an HUD device mounted on the helmet, the upper side and the lower side in the direction corresponding to the top-bottom direction of the face of a user wearing the helmet will be referred to as "upper" and "lower," respectively, the front side and the rear side in the direction corresponding to the front-rear direction of the face of the user wearing the helmet will be referred to as "front" and "rear," respectively, and the left side and the right side of the face of the user wearing the helmet and facing forward will be referred to as "left, and "right," respectively.

<Configuration of Information Presentation System>

Figure 1:
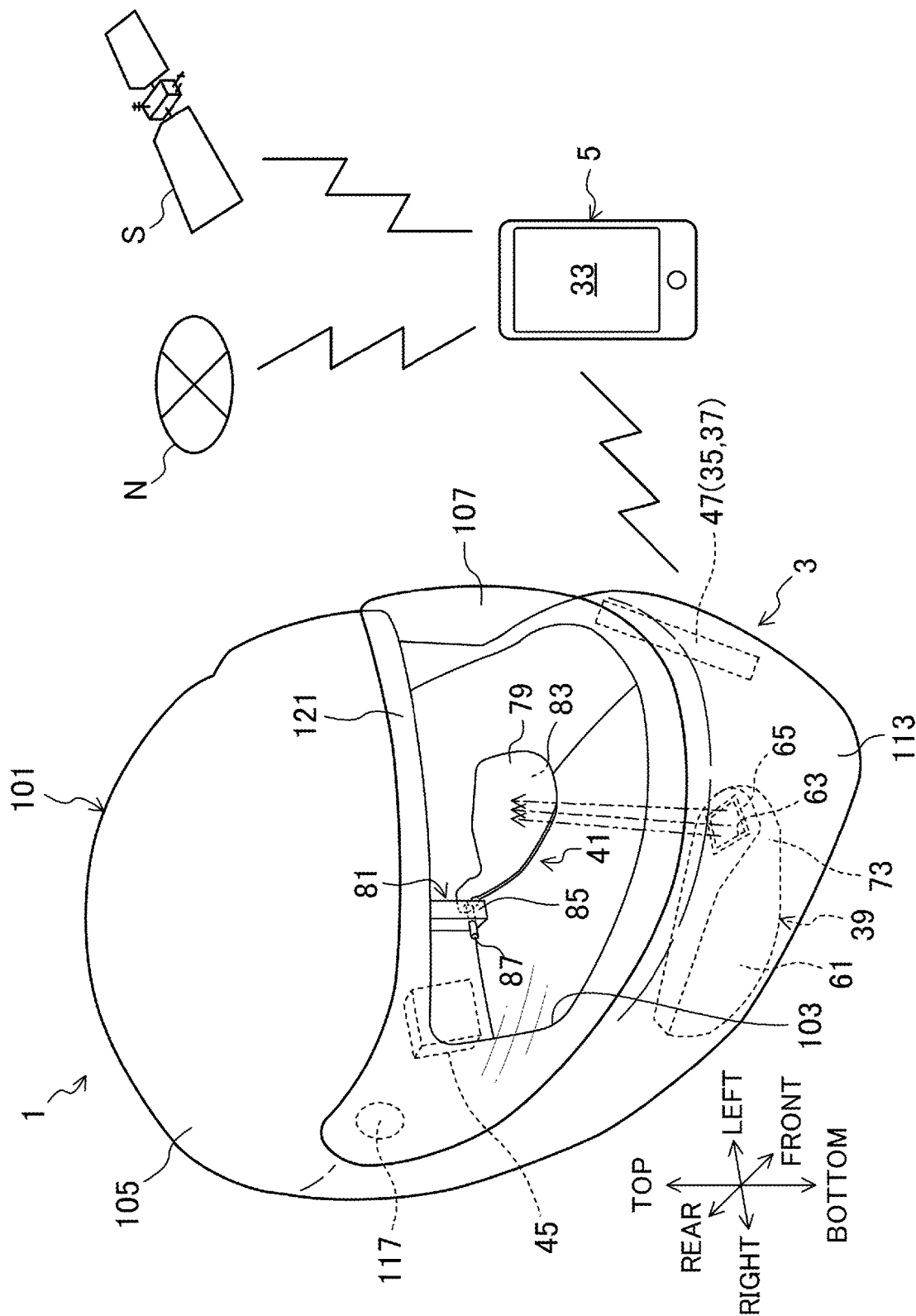
FIG. 1 an overall configuration diagram schematically illustrating an information presentation system according to an embodiment.
Figure 2:
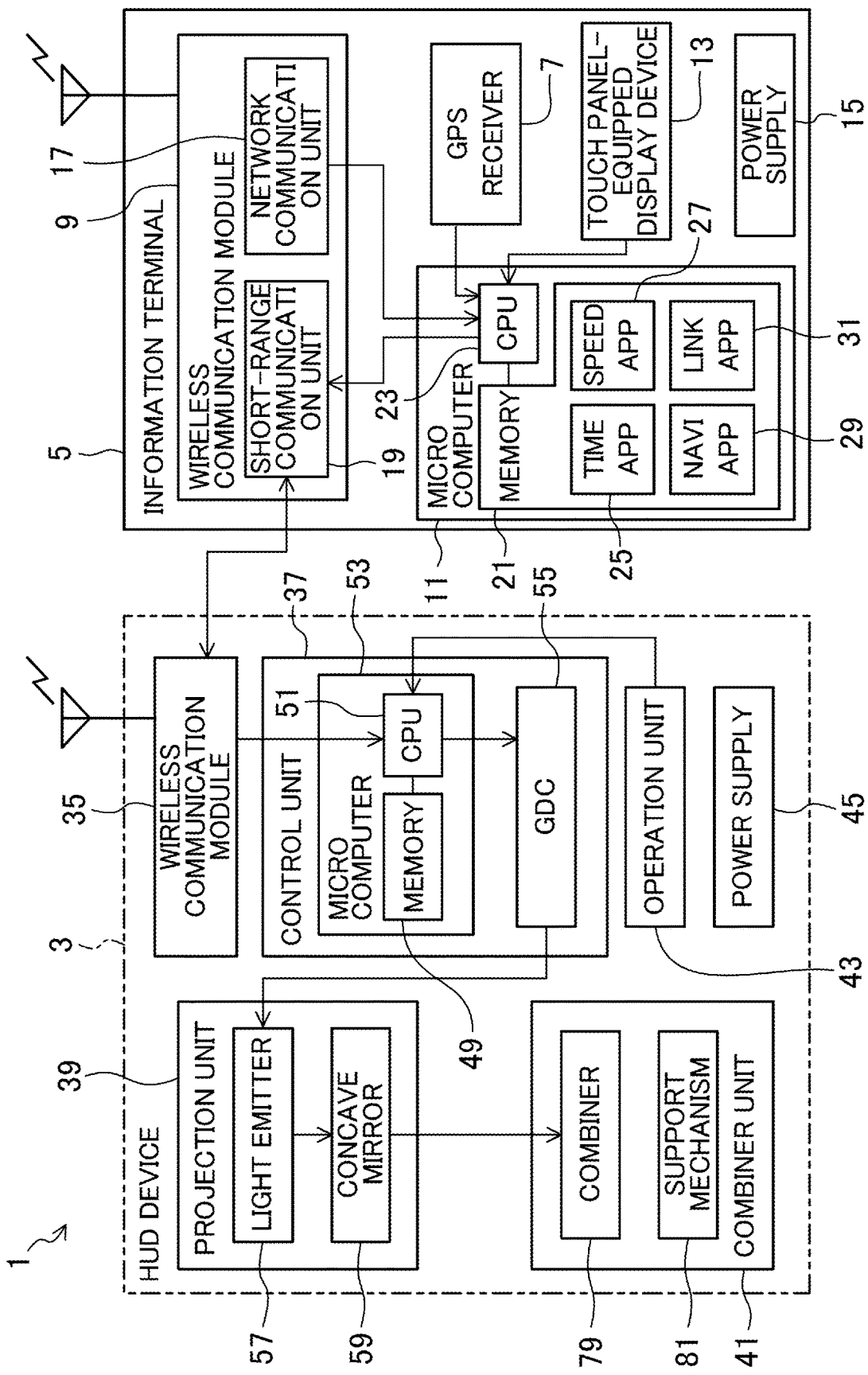
FIG. 2 is a block diagram schematically showing the information presentation system according to the embodiment.

FIG. 1 an overall configuration diagram schematically illustrating an information presentation system 1 according to this embodiment. FIG. 2 is a block diagram schematically illustrating the information presentation system 1. In FIG. 1, chain double-dashed arrows represent a path and a traveling direction of display light. The information presentation system 1 is a system that presents information contributing to driving assistance to a rider (user) of a motorcycle, and includes an HUD device 3 mounted on a helmet 101 of the motorcycle, and an information terminal 5 that provides various types of information to be displayed to the HUD device 3, as illustrated in FIGS. 1 and 2.

—Configuration of Information Terminal—

As the information terminal 5, a small-size multi-function cellular phone called a smartphone is used. The information terminal 5 includes a global positioning system (GPS) receiver 7 that receives radio waves from a GPS satellite and generates positioning information, a wireless communication module 9 that performs wireless communication with the outside, a microcomputer 11 that controls overall operation of the information terminal 5, a touch panel-equipped display device 13 serving as an input/output device, and a power supply 15 that supplies electric power necessary for operating the information terminal 5.

The GPS receiver 7 is constituted by including an unillustrated GPS antenna and other components. The GPS antenna receives GPS signals transmitted from a plurality of GPS satellites S launched into the earth orbit. Based on the GPS signals received with the GPS antenna, the GPS receiver 7 acquires information on a current position (e.g., a latitude, a longitude, and an altitude) of the information terminal 5. The GPS receiver 7 stores the obtained positional information of the information terminal 5 in a memory 21 included in the microcomputer 11 and updates the information sequentially, in response to a request from the microcomputer 11.

The wireless communication module 9 includes a network communication unit 17 that communicates with an external network N as a wide area network, such as the Internet, and a short-range communication unit 19 that communicates with the HUD device 3 wirelessly in a short range.

The network communication unit 17 has a wireless local area network (LAN) function such as wireless fidelity (WiFi, registered trademark) and a communication function in mobile communication standards such as a long time evolution (LTE, registered trademark). In response to a request from the microcomputer 11, the network communication unit 17 receives map information from the external network N, road information concerning, for example, construction and traffic congestion, information on peripheral facilities based on the current position acquired by the GPS receiver 7, and net information such as disaster information, and temporarily stores the received information in the memory 21 included in the microcomputer 11.

The short-range communication unit 19 has a communication function in a short-range wireless communication standard such as Bluetooth (registered trademark). In response to a request from the microcomputer 11, the short-range communication unit 19 reads, from the memory 21, various types of information including positional information of the information terminal 5 acquired by the GPS receiver 7, net information acquired by the network communication unit 17, application (hereinafter referred to as "app") information acquired by various types of application software described later, and long-time information on display items displayed by the HUD device 3 and display setting such as brightness, and transmits the read-out information to the HUD device 3 by wireless communication.

The microcomputer 11 includes the memory 21 and a central processing unit (CPU) 23. The memory 21 temporarily or permanently stores various types of information including programs for operating the information terminal 5. The memory 21 is typically implemented by a combination of a random access memory (RAM) and a read only memory (ROM). Various programs stored in the memory 21 include a mobile operating system (OS) and a plurality of apps that operate to implement specific functions on the mobile OS.

The plurality of apps include a time app 25, a speed app 27, a navigation app (hereinafter referred to as a "navi app") 29, and a link app 31. These apps 27, 29, and 31 are previously installed in the information terminal 5 and stored in the memory 21.

The time app 25 is software for acquiring a current time. The time app 25 acquires a current time based on, for example, a time stamp acquired by communication with a base station or time information acquired by the GPS receiver 7, and further by using a time synchronization technique such as a network identity and time zone (NITZ) or a network time protocol (NTP).

The speed app 27 is software for detecting a moving speed of the information terminal 5. The speed app 27 detects a moving speed of the information terminal 5 based on, for example, positional information of the information terminal 5 acquired by the GPS receiver 7.

The navi app 29 is software for providing a route guide to a destination set by the user. The navi app 29 provides a route guide to a destination based on, for example, map information acquired by the network communication unit 17 or previously stored in the memory 21 and positional information of the information terminal 5 acquired by the GPS receiver 7.

The link app 31 is software that is linked to the HUD device 3 using wireless communication by the short-range communication unit 19 and transmits, to the HUD device 3, various types of information such as app information, net information, and information on display setting in the HUD device 3.

The link app 31 is used for display setting of the HUD device 3. Specifically, as the display setting, items displayed by the HUD device 3 can be selected from a plurality of items including a current time, a moving speed, and route guide information (navigation information), and brightness of a display image displayed by the HUD device 3 can be set. Information on display setting set by the link app 31 is stored in the memory 21.

The CPU 23 is typically implemented by, for example, an integrated circuit (IC), large scale integration (LSI), or an application specific integration circuit (ASIC). The CPU 23 performs computation for processing various types of data, and controls operations of the wireless communication module 9 and the touch panel-equipped display device 13 and executions of the apps 25, 27, 29, and 31.

With the function of the CPU 23, the microcomputer 11 causes the GPS receiver 7 to acquire information on a current position and the network communication unit 17 to establish connection to the external network N to collect net information, and executes the link app 31 to cause the short-range communication unit 19 to establish connection to the HUD device 3 and transmits app information, net information, and display setting information to the HUD device 3 by various processing in accordance with executions of the other apps 25, 27, and 29.

The touch panel-equipped display device 13 is an electronic device obtained by combining a display device that displays an image on a screen 33 of the information terminal 5 and a touch panel that detects a position (touched position) on the screen 33 touched by the user. The touch panel-equipped display device 13 has the function of outputting an image and the function of receiving a user operation. In the information terminal 5, executions of the apps 25, 27, 29, and 31 and display setting in the HUD device 3 in executing the link app 31 can be performed by a touch operation on the touch panel-equipped display device 13.

The power supply 15 is constituted by a secondary battery such as a lithium ion battery. The power supply 15 is electrically connected to the wireless communication module 9, the microcomputer 11, and the touch panel-equipped display device 13 through wires. When power is turned on with an unillustrated power supply switch, the information terminal 5 supplies electric power from the power supply 15 to the wireless communication module 9, the microcomputer 11, and the touch panel-equipped display device 13 so that a predetermined operation is performed in accordance with an operation by the user.

The information terminal 5 also serves as an operator that receives an operation for display setting in the HUD device 3. In terms of visual recognizability for HUD display, the information terminal 5 copes with exchange to a shield 107 having a different light transmittance and, brightness to cope with of an individual difference about brightness of HUD display at which the user feels easy in visual recognition, brightness of HUD display can be manually set by the user by using the link app 31 as described above as one of display setting.

Figure 10:
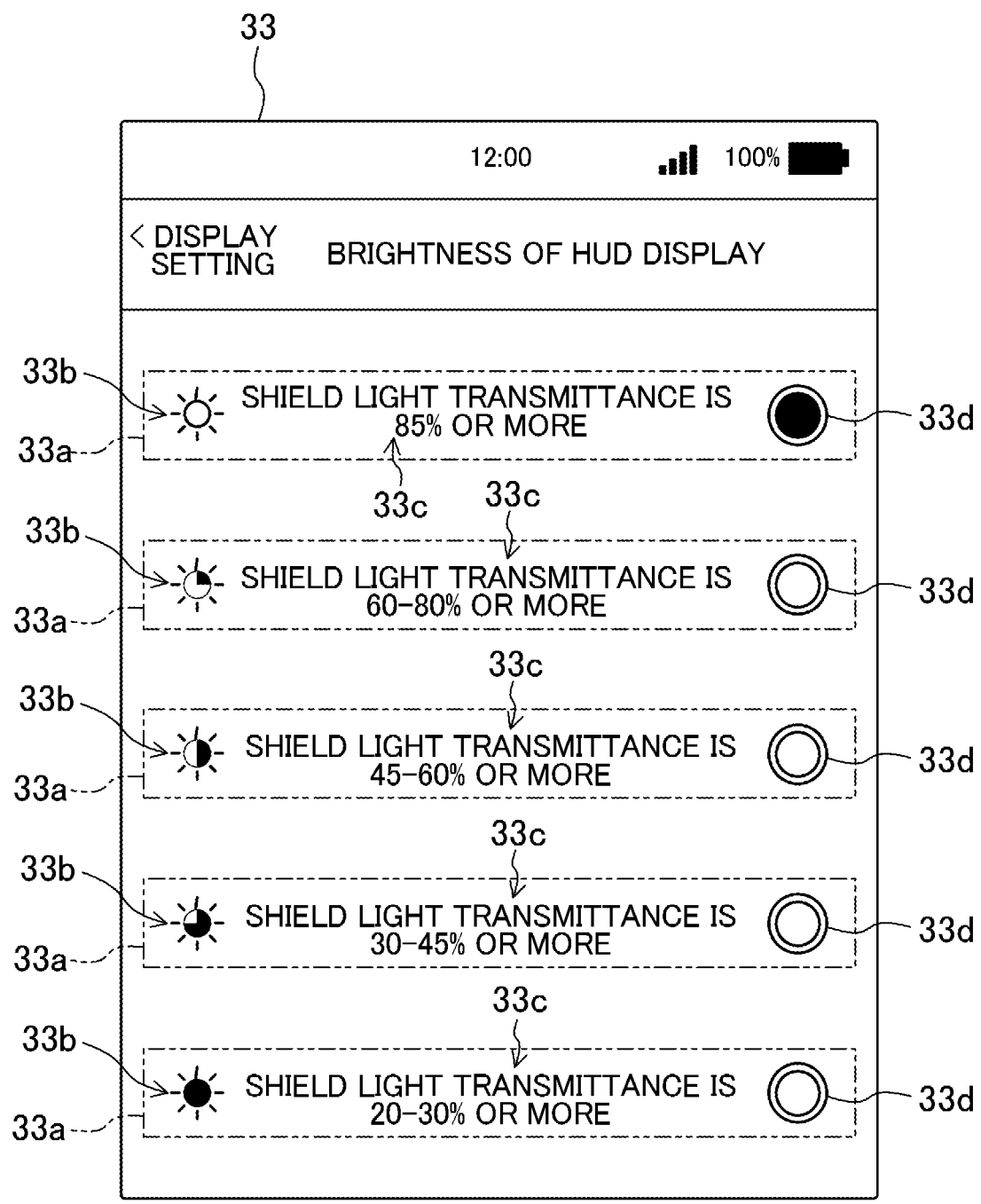
FIG. 10 is a view illustrating an example of a screen for setting brightness of HUD display on an information terminal according to the embodiment.

FIG. 10 is a view illustrating an example of the screen 33 for setting brightness of HUD display on the information terminal 5. In this embodiment, brightness of HUD display set by the link app 31 is classified into five levels from a first level through a fifth level. As the screen 33 for setting brightness of HUD display, a screen with a layout representing brightness level options 33a of five levels from the first level to the fifth level, as exemplified in FIG. 10, can be employed. In the five brightness levels, brightness decreases in the order of the first brightness level, the second brightness level, the third brightness level, the fourth brightness level, and the fifth brightness level. That is, the first brightness level is the brightest level, and the fifth brightness level is the darkest level.

In the screen 33 for setting brightness of the HUD display, the first through fifth brightness level options 33a are represented in this order from the top. In each of the brightness level options 33a, an icon 33b indicating the degree of brightness, a description 33c concerning a recommended light transmittance of the shield 107, and a selection field 33d of this brightness level are laterally arranged as one set, for example. In the link app 31, in the screen 33 showing setting as described above, the user selects one of the five brightness level options 33a by touching the selection field 33d in the selected brightness level option 33a so that brightness of HUD display is set. FIG. 10 illustrates an example in which the first brightness level option 33a is selected.

—Configuration of HUD Device—

Figure 3:
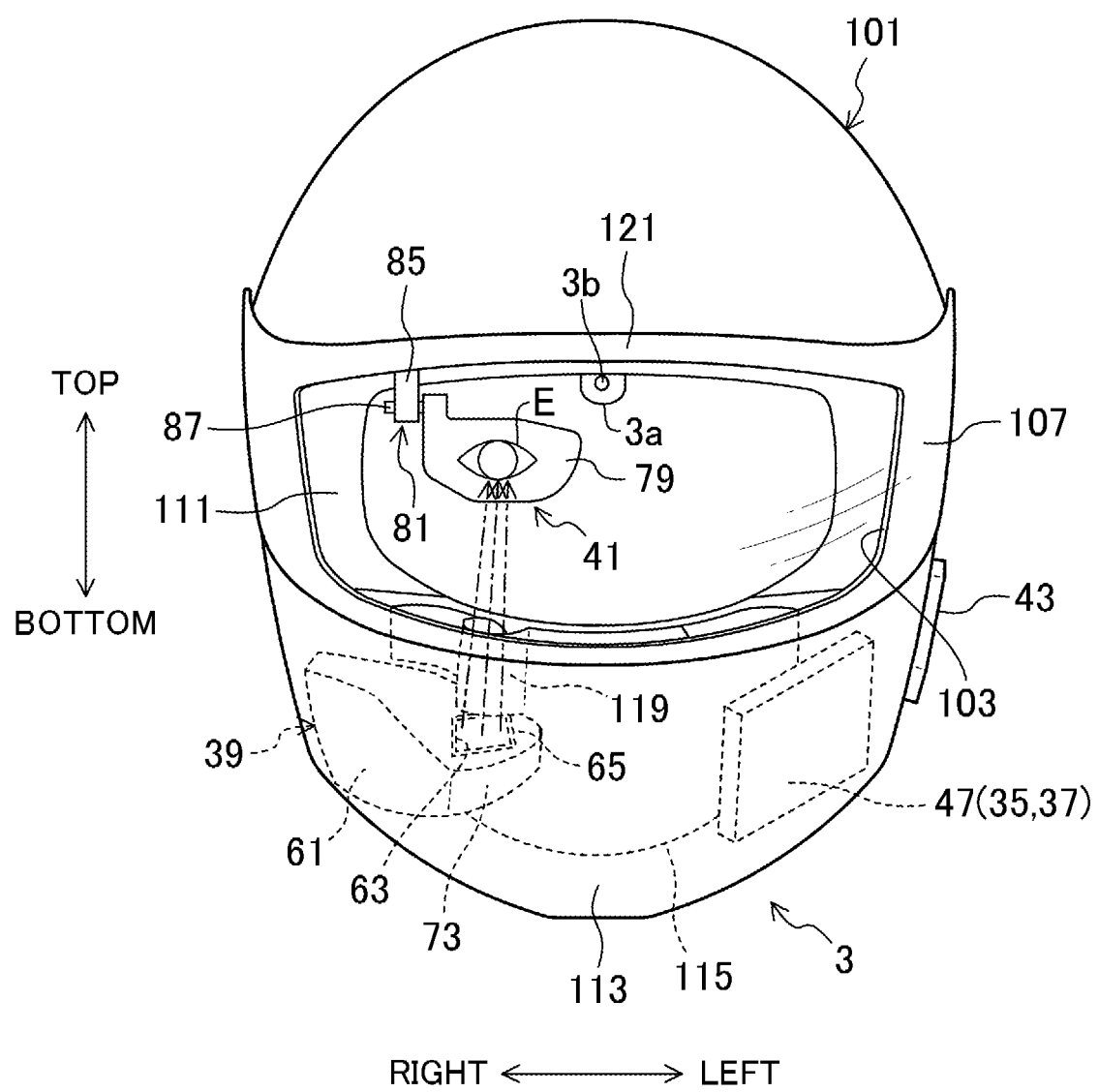
FIG. 3 is a front view of a helmet equipped with an HUD device according to the embodiment.
Figure 4:
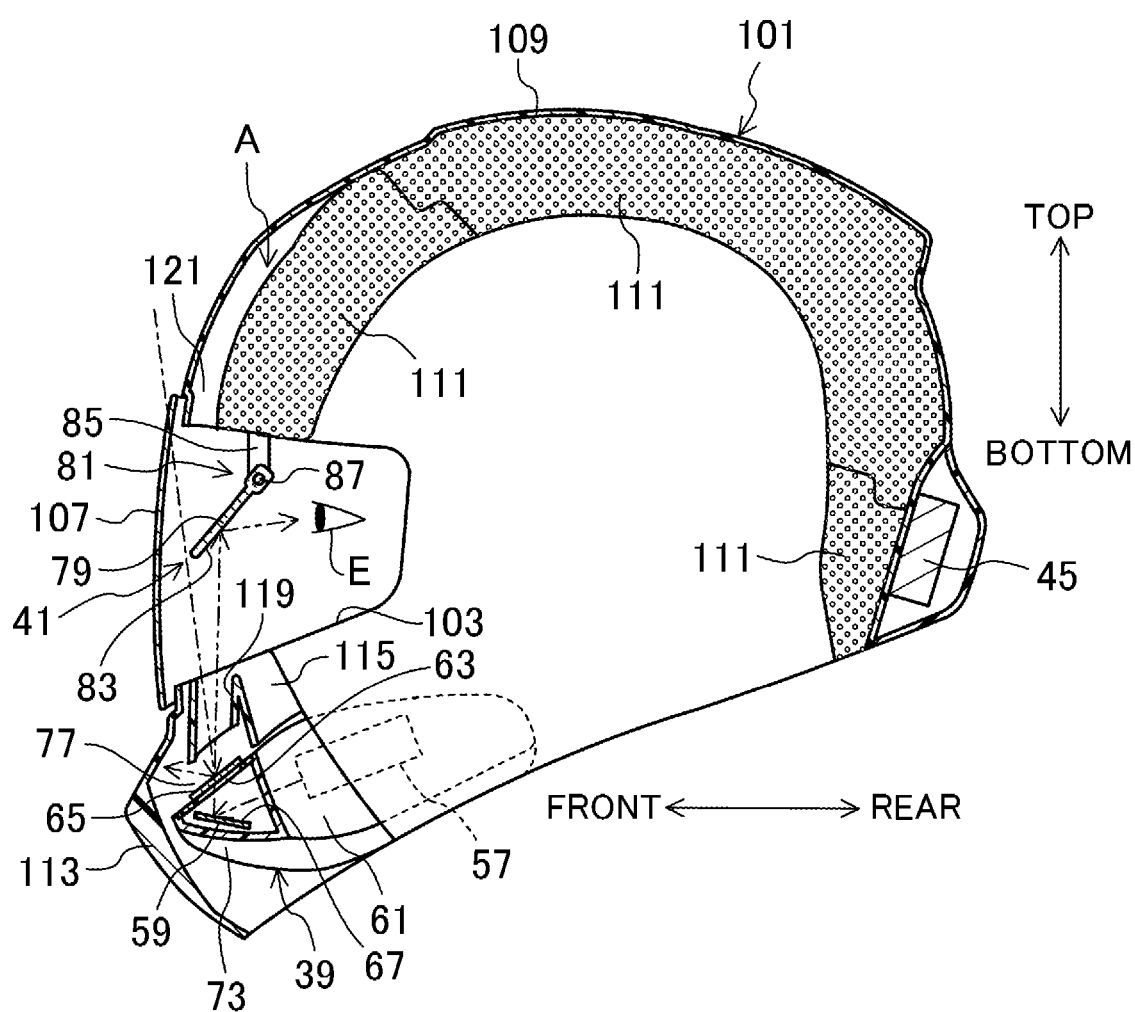
FIG. 4 is a cross-sectional view of the helmet equipped with the HUD device according to the embodiment.
Figure 5:
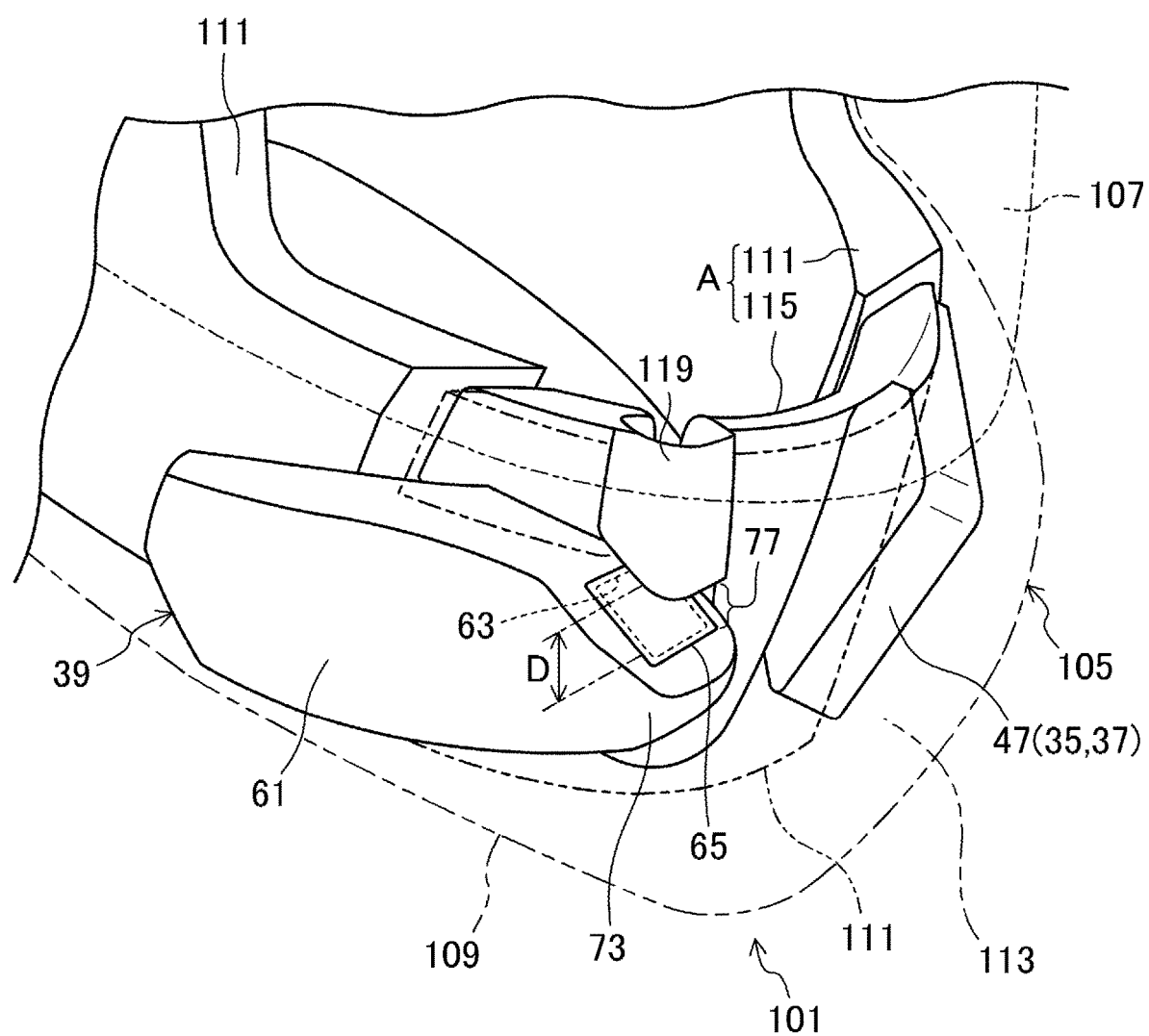
FIG. 5 is a perspective view illustrating a main portion of the helmet equipped with the HUD device according to the embodiment.
Figure 6:
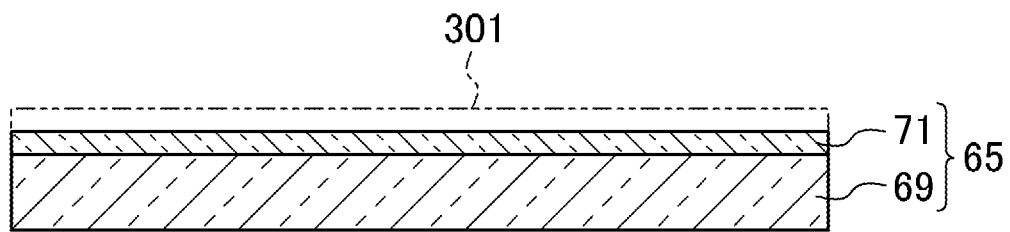
FIG. 6 is a cross-sectional view of a cover member used in the HUD device according to the embodiment.
Figure 7:
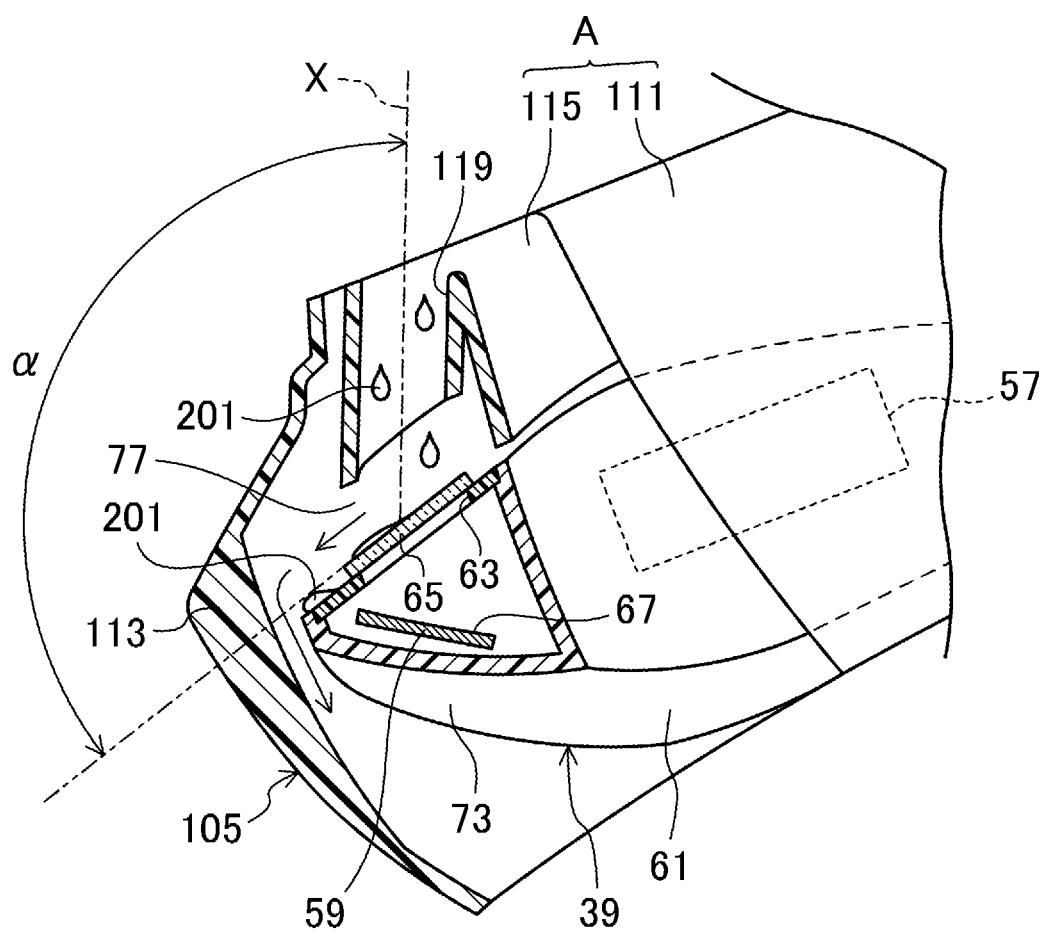
FIG. 7 is a cross-sectional view illustrating a main portion of the helmet equipped with the HUD device according to the embodiment.

FIG. 3 is a front view of the helmet 101 equipped with the HUD device 3. FIG. 4 is a cross-sectional view of the helmet 101 equipped with the HUD device 3. FIG. 5 is a perspective view illustrating a main portion of the helmet 101 equipped with the HUD device 3. FIG. 6 is a cross-sectional view of a cover member 65 for use in the HUD device 3. FIG. 7 is a cross-sectional view illustrating a main portion of the helmet 101 equipped with the HUD device 3.

In FIGS. 3 and 4, chain double-dashed arrows represent a path and a traveling direction of display light, in a manner similar to FIG. 1. In FIG. 4, a liner 111 in a chin portion 113 of a helmet body 105 is not shown for convenience of description. In FIG. 5, parts of a shell 109, the shield 107, and the liner 111 of the helmet 101 are represented by chain double-dashed lines, and these components of the helmet 101 are illustrated transparent for description of the main portion.

The HUD device 3 is a projection type display device that projects visual information on the field of view of the user wearing the helmet 101. As illustrated in FIGS. 1 through 4, the HUD device 3 includes the wireless communication module 35 that performs wireless communication with the outside, a control unit 37 that controls a display operation in the HUD device 3, a projection unit 39 that generates and projects display light, a combiner unit 41 for causing a display image by display light projected from the projection unit 39 to be visually recognized as a virtual image by the user, an operation unit 43 for inputting an operation by the user to the HUD device 3, and a power supply 45 that supplies electric power necessary for operating the HUD device 3. In addition, as illustrated in FIG. 3, the HUD device 3 includes an external light sensor 3a used for automatically adjusting brightness of a display image to external environments.

The helmet 101 equipped with the HUD device 3 according to this embodiment is a full face helmet, and includes the helmet body 105 having, in a front portion thereof, a window opening 103 for providing a field of view to a user wearing the helmet 101, and the transparent shield 107 configured to be exchangeably attached to the helmet body 105 and to open and close the window opening 103.

As illustrated in FIGS. 3 through 5, the helmet body 105 includes the shell 109 (also referred to as a hat body) constituting an outer hull of the helmet body 105, the liner 111 provided on the entire inner side of the shell 109, and a mouse cover 115 provided on the inner side of the liner 111 in the chin portion 113 of the helmet body 105. The shell 109 is made of, for example, an acrylonitrile butadiene styrene (ABS) resin or fiber reinforced plastics (FRP), and disperses shock energy from the outside. The shell 109 is an exterior member. The liner 111 is made of, for example, polystyrene foam and functions as a cushioning body that absorbs shock energy. The mouse cover 115 is made of, for example, an ABS resin or FRP, holds and protects the liner 111, and provides an aesthetic design to the upper surface of the chin portion 113 of the helmet body 105. The liner 111 and the mouse cover 115 are members disposed inside the exterior member, and constitute an interior member A.

The shield 107 is attached to the left and right sides of the window opening 103 of the helmet body 105 (shell 109) with, for example, fasteners 117 to be rotatable within a predetermined angle range such that the window opening 103 is opened and closed by rotation of the shield 107 in the top-bottom direction. The shield 107 is made of a resin having transparency to light, such as polycarbonate.

The shield 107 blocks foreign substances such as dust, wind, and ultraviolet radiation entering the helmet body 105 through the window opening 103 in a state where the window opening 103 is closed. The shield 107 can be detached by removing the fasteners 117, and can be exchanged with various shields having different light transmittances, such as a colorless transparent shield, a colored transparent shield exemplified by a smoke shield, or a mirror shield, depending on brightness of external environments.

The wireless communication module 35 has a communication function in a short-range wireless communication standard such as Bluetooth. The wireless communication module 35 receives net information and app information from the short-range communication unit 19 of the information terminal 5 and display setting information, and stores the received information in the memory 49 included in the microcomputer 53, in response to a request from the microcomputer 53 included in the control unit 37. The wireless communication module 35 is provided on a PCB together with the control unit 37, and incorporated as a PCB module 47 in a left side of the chin portion 113 of the helmet body 105.

The external light sensor 3a is a so-called luminance sensor, and includes a light-receiving device, such as a photodiode, for generating photocurrent in accordance with brightness of external light in a light-receiving part 3b for receiving external light. The external light sensor 3a converts external light incident on the light-receiving device to a current, and detects brightness of the external light. The external light sensor 3a is electrically connected to the microcomputer 53, and outputs the detected brightness of the external light to a CPU 51 included in the microcomputer 53.

The external light sensor 3a is disposed on the helmet body 105 to be located inside the shield 107 in a closed state. Specifically, the external light sensor 3a is provided at the center in the left-right direction or near the center on the lower surface of a forehead portion 101a located at the upper side in the top-bottom direction of a peripheral portion of the window opening 103 of the helmet body 105 in a posture in which brightness of external light incident through the window opening 103 is detected, that is, a posture in which the light-receiving part 3b faces the window opening 103.

Figure 11:
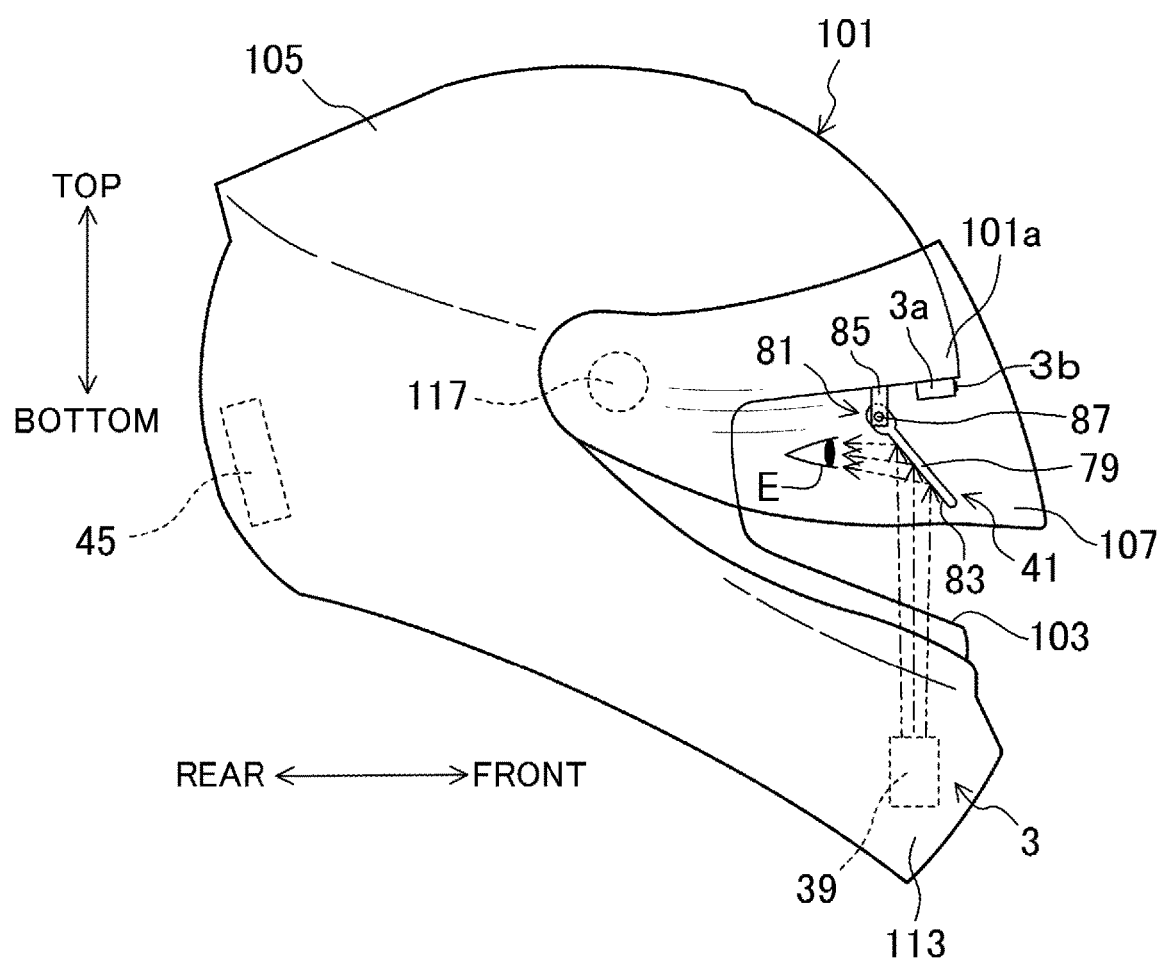
FIG. 11 is a side view illustrating a state where a shield of the helmet equipped with the HUD device according to the embodiment is open halfway.

As illustrated in FIG. 11, the shield 107 of the helmet 101 equipped with the HUD device 3 can be made open halfway. While it is humid or raining, if the shield 107 is lowered and the window opening 103 is completely closed, moisture is trapped in the helmet 101 and the user feels uncomfortable in some cases. In view of this, to ventilate the inside of the helmet 101 while protecting the eyes of the user, the user opens the shield 107 halfway such that a lower portion of the window opening 103 is open and an upper portion of the window opening is partially covered, and uses the HUD device 3 in this state in some cases.

In the HUD device 3, since the external light sensor 3a is located at the upper side in the top-bottom direction of a peripheral portion of the window opening 103 of the helmet body 105, even when the shield 107 of the helmet 101 is open halfway, a right-receiving side (a side toward the light-receiving part 3b) of the external light sensor 3a is covered with the shield 107. Accordingly, even in a case where the HUD device 3 is used with the shield 107 open halfway, brightness of external light in the same space as a visually recognized environment of the user is detected by the external light sensor 3a within the shield 107, and thus, brightness of a display image can be suitably automatically adjusted based on the brightness of external light detected by the external light sensor 3a.

The control unit 37 controls generation of display light in a light emitter 57 included in the projection unit 39. The control unit 37 includes the microcomputer 53 including the memory 49 and the CPU 51, and a graphics display controller (GDC) 55 as an integrated circuit in charge of processing concerning image display.

The memory 49 temporarily or permanently stores various types of information including programs for operating the HUD device 3. The memory 49 also stores net information and app information received by the wireless communication module 35 and information on display setting. The memory 49 is typically implemented by a combination of a RAM and a ROM.

The memory 49 stores a look-up table 66 (illustrated in FIG. 12) showing a relationship between brightness of external light in the shield 107 detected by the external light sensor 3a and intensity of display light forming a display image.

Figure 12:
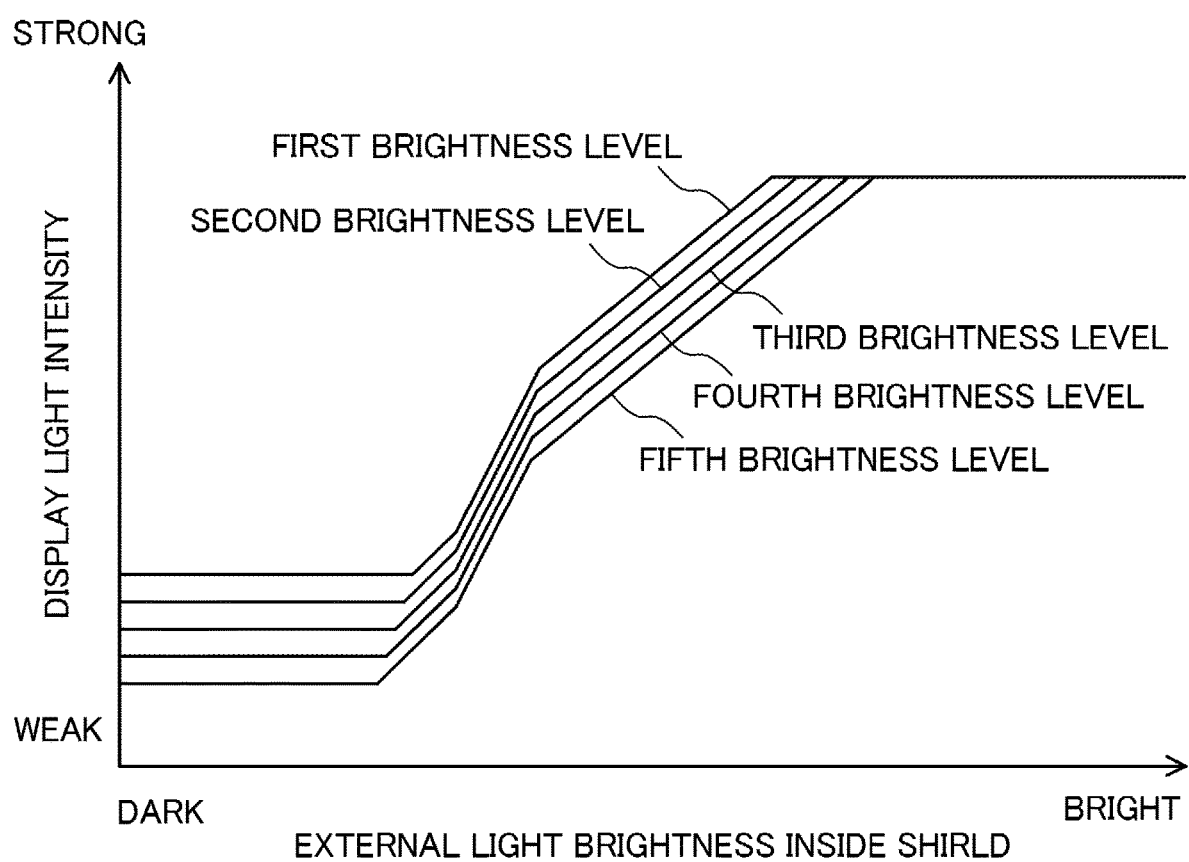
FIG. 12 is a graph showing values stored in an array of a look-up table.

FIG. 12 is a graph showing values stored in an array of the look-up table 66. The look-up table 66 is a data structure having an array storing values as shown in the graph of FIG. 12, in order to adjust intensity of display light in accordance with brightness of external light in the shield 107 detected by the external light sensor 3a. In the array of the look-up table 66, values representing intensities of display light are defined for brightness levels of HUD display set by the information terminal 5 in such a manner that intensity of display light increases as brightness of external light in the shield 107 increases, whereas intensity of display light decreases as brightness of external light in the shield 107 decreases, in association with values indicating brightness of external light in the shield 107 detected by the external light sensor 3a.

The CPU 51 is typically implemented by, for example, IC, LSI, or ASIC. The CPU 51 performs computation for processing various types of data, and controls operations of the wireless communication module 35, the projection unit 39, and the GDC 55.

The GDC 55 generates data of a display image to be visually recognized by the user through the combiner 73 included in the combiner unit 41, based on net information and app information stored in the memory 49 and display setting information. Data of the display image generated by the GDC 55 is image data representing information of items set in display setting o the link app 31 of the information terminal 5. With the function of the CPU 51, the microcomputer 53 causes the GDC 55 to generate data of a display image and output a signal of the image to the light emitter 57 included in the projection unit 39.

At this time, based on a brightness level of HUD display set by the information terminal 5 and brightness of external light in the shield 107 detected by the external light sensor 3a, the CPU 51 refers to the look-up table 66 stored in the memory 49, determines an intensity of display light in accordance with the brightness of external light in the shield 107, and outputs information on the determined intensity of display light to the light emitter 57 together with image data of a display image. In this manner, the control unit 37 causes the light emitter 57 to generate display light such that a display image visually recognized by the user has brightness adjusted in accordance with the brightness of external light in the shield detected by the external light sensor 3a in a brightness level set by the information terminal 5.

The projection unit 39 is incorporated in a right side of the chin portion 113 of the helmet body 105. The projection unit 39 includes the light emitter 57 that generates and emits display light of a pattern corresponding to a display image based on an image signal input from the GDC 55, a concave mirror 59 that reflects display light emitted from the light emitter 57 toward the combiner unit 41, a housing 61 that houses the light emitter 57 and the concave mirror 59, and the cover member 65 covering a projection opening 63 formed in the housing 61.

The housing 61 is provided in a portion extending from a right rear side to a right front side of the chin portion 113 of the helmet body 105 in a posture in which the projection opening 63 faces upward. The housing 61 is constituted by a combination of a plurality of unillustrated resin housing components, and an accommodation space for accommodating the light emitter 57 and the concave mirror 59 is provided therein. The projection opening 63 is an opening through which display light emitted from the light emitter 57 passes from the inside (accommodation space) of the housing 61 toward the outside, and is formed in a substantially rectangular shape in the upper surface of a front portion of the housing 61.

The light emitter 57 is accommodated in a portion from an approximately intermediate portion of the housing 61 to a rear portion of the housing 61 opposite to the projection opening 63. Although not shown, the light emitter 57 is obtained by combining a display element constituted by a light source such as a light emitting diode (LED) and a reflection type display panel such as a liquid crystal on silicon (LCOS) panel, an optical lens such as a convex lens or a concave lens, a diffusion plate, and a plurality of optical members such as total internal reflection (TIR) prisms. The light emitter 57 generates display light having an intensity at which a display image displayed by the HUD device 3 is at a brightness level set by the information terminal 5, and emits the generated display light to the concave mirror 59.

The concave mirror 59 is accommodated in a front portion of the housing 61 and below the projection opening 63. The concave mirror 59 has a reflection surface 67 with a free-form surface shape having no rotational symmetry and is oriented with the reflection surface 67 facing the projection opening 63. The concave mirror 59 reflects display light received from the light emitter 57 on the reflection surface 67 upward toward the projection opening 63, and shapes a display image visually recognized by the user in a size at a position suitable for display during driving.

In the projection unit 39, display light emitted from the light emitter 57 and reflected on the concave mirror 59 passes through the projection opening 63, and is projected onto a combiner 79 included in the combiner unit 41 through the cover member 65. The cover member 65 is an approximately rectangular plate-shaped object, has transparency to light, and passes display light therethrough. As illustrated in FIG. 6, the cover member 65 includes a base material 69 of, for example, polycarbonate (PC) and a coating film 71 provided on a surface of the base material 69. The coating film 71 is made of, for example, silicate ($xM^1_2O \cdot ySiO_2$), and is hydrophilic. That is, the surface of the cover member 65 is provided with hydrophilia by the coating film 71.

In the projection unit 39, a projection portion 73 in which the projection opening 63 of the housing 61 is covered with the cover member 65 is located inside the chin portion 113 of the helmet body 105 and outside the mouse cover 115. The mouse cover 115 is curved along the shape of the chin portion 113 of the helmet body 105. A cylindrical optical path portion 119 is integrally provided in the right side of the mouse cover 115 and bulges forward. The optical path portion 119 is a part of the mouse cover 115. The optical path portion 119 is located at a side facing the projection opening 63 of the housing 61 constituting the projection unit 39.

A cylinder center axis X of the optical path portion 119 extends in the top-bottom direction, and thus, the optical path portion 119 extends in the top-bottom direction. A lower end opening of the optical path portion 119 is a light incident port on which display light from the projection unit 39 is incident. The light incident port of the optical path portion 119 faces the cover member 65 of the projection unit 39 and is located above the cover member 65 at a predetermined distance. Thus, the light incident port of the optical path portion 119 faces the projection opening 63 of the projection unit 39 with the cover member 65 interposed therebetween. The optical path portion 119 is disposed above the cover member 65 at a distance, and a gap 77 is formed between an end of the optical path portion 119 at the light incident port side and the upper surface of the cover member 65. The size of the gap 77 will be described later. On the other hand, an upper end opening of the optical path portion 119 is an end at a light emission side from which display light from the projection unit 39 is emitted, and serves as a light emission port. The light emission port of the optical path portion 119 is open at an upper surface of the mouse cover 115 in the surfaces of the mouse cover 115. Specifically, the surface at which the light emission port of the optical path portion 119 is open is the surface of the mouse cover 115 located at the top (i.e., the upper surface of the mouse cover 115). The light emission port of the optical path portion 119 is open toward the combiner 79 included in the combiner unit 41. The upper and lower end openings of the optical path portion 119 are not closed with other members, and are both open. At the outer side of the mouse cover 115, the liner 111 is provided to surround a portion above the projection portion 73 of the projection unit 39 and the optical path portion 119.

As described above, the projection unit 39 is incorporated in the chin portion 113 of the helmet body 105 such that display light projected in the combiner 79 through the cover member 65 passes through the optical path portion 119. The cover member 65 constituting the projection portion of the projection unit 39 is disposed at the inner side of the interior member A than the surface (upper surface) at which the end of the optical path portion 119 at the light emission side in the surface of the mouse cover 115 is open. That is, when seen from above, since the cover member 65 is located at a deep position in the interior member A, when the user holds the chin portion 113 in using the helmet 101, fingers of the user do not easily touch the cover member 65. In particular, in this embodiment, since the optical path portion 119 is cylindrical and located above the cover member 65, a finger needs to be inserted in the optical path portion 119 intentionally in order to touch the cover member 65. For this reason, the user does not easily touch the cover member 65 with fingers or hands in using the helmet 101, either.

The cover member 65 is inclined to a direction in which the surface from which display light is emitted is oriented toward the outside of the helmet body 105. Specifically, the cover member 65 is in an inclined posture in which the surface thereof is inclined forward at an obtuse angle with respect to the cylinder center axis X of the optical path portion 119. Accordingly, external light that has been applied to the inside of the helmet 101 and entered the optical path portion 119 is reflected on the surface of the cover member 65 toward the back side of the shell 109 constituting the chin portion 113 so that reflection of the external light to an eye E of the user wearing the helmet 101 can be reduced.

From the viewpoint of preventing reflection of external light on the surface of the cover member 65 to the eye E of the user, the inclined posture of the cover member 65 described above is preferably a posture in which the end surface from which display light is emitted forms an obtuse angle with respect to the incident direction of external light that has been applied to the inside of the helmet 101 and entered the optical path portion 119 and can reach the cover member 65. For example, an angle α formed by the surface of the cover member 65 and the cylinder center axis X of the optical path portion 119 to the front side is greater than or equal to 100 degrees and less than or equal to 125 degrees.

The cover member 65 is disposed at a distance from the optical path portion 119 with the gap 77 interposed therebetween in the top-bottom direction in which the projection unit 39 projects display light. The gap 77 is provided along the entire periphery of the lower end of the optical path portion 119. Accordingly, even when foreign substances such as dust or moisture such as rainwater enters the optical path portion 119 from the upper end opening thereof, the substances or moisture can be released to the outside through the gap 77 between the cover member 65 and the projection unit 39 and the optical path portion 119. A size D of the gap 77, that is, a distance between the surface of the cover member 65 and the lower end of the optical path portion 119 is greater than or equal to 1 mm and less than or equal to 5 mm, for example. The gap 77 only needs to have the size D described above at least partially.

The combiner unit 41 includes the combiner 79 that receives display light reflected by the concave mirror 59 from below and reflects the display light to a direction in which the display light can be visually recognized by the user, and a support mechanism 81 that supports the combiner 79 in a position in front of an eye of the user wearing the helmet 101.

The combiner 79 is a transparent or translucent plate-shaped part, and has a semi-transmissive reflection surface 83 of a free-form surface shape without rotational symmetry (flat plate shape in the drawings). The combiner 79 is disposed inside the shield 107 in a closed state. The combiner 79 is a projection target having both light transmittance and light reflection, and is constituted by a semitransparent mirror. The semitransparent mirror has the property of reflecting part of incident light and being transmissive part of the incident light. The back surface of the combiner 79 is provided with an anti-reflection film called an anti-reflection (AR) coating of, for example, magnesium fluoride ($MgF_2$).

The support mechanism 81 supports the combiner 79 at a position within the forward field of view of the user in the window opening 103 in a front portion of the helmet body 105. The combiner 79 is disposed in front of the right eye E of the user, and is supported by the support mechanism 81 in a forward leaning posture in which the semi-transmissive reflection surface 83 is located at the face side of the user, the rear end is located above, and the front end is located below.

The support mechanism 81 includes a stay 85 extending in the top-bottom direction. An upper portion of the stay 85 is retained by an unillustrated holder incorporated in the forehead portion 121 of the helmet body 105. A lower end of the stay 85 is coupled to the combiner 79 through a rotation shaft 87 extending in the left-right direction. The support mechanism 81 can adjust orientation of the semi-transmissive reflection surface 83 by rotation of the combiner 79 about the rotation shaft 87.

The operation unit 43 is provided at a location corresponding to the PCB module 47 of the helmet body 105. Although not shown, the operation unit 43 includes a power supply switch and an operation switch. The power supply switch is a push-button switch having the function of switching the power supply of the HUD device 3 between on and off. The operation switch is a push-button switch having the function of switching display of the HUD device 3 between on and off.

The power supply 45 is incorporated in an occipital portion of the helmet body 105. The power supply 45 is constituted by a secondary battery such as a lithium ion battery. The power supply 45 is electrically connected to the wireless communication module 35, the control unit 37, and the light emitter 57 through wires. When the power supply switch is turned on in the operation unit 43, the HUD device 3 supplies electric power from the power supply 45 to the wireless communication module 35, the control unit 37, and the light emitter 57 and performs a display operation depending on switching between on and off of display by operation of the operation switch.

<Operation of Information Presentation System>

In the information presentation system 1 having the configuration described above, when the power supply of the HUD device 3 is turned on and the link app 31 is executed in the information terminal 5, net information, app information, and display setting information are received by the HUD device 3. Then, based on the received net information and app information, data of a display image corresponding to previously set items included in the display setting information are generated by the GDC 55. At this time, if display of the HUD device 3 is on, in the light emitter 57 of the projection unit 39, display light corresponding to data of the display image generated by the GDC 55 is generated with an intensity of light corresponding to a brightness level of a display image set in the information terminal 5. This display light is emitted from the light emitter 57, then reflected on the concave mirror 59, projected from the projection unit 39 into the combiner 73, and then further reflected by the combiner 73 to fall within the field of view of the user. Accordingly, the user visually recognizes a display image by display light as a virtual image with the virtual image superimposed on the scenery in the forward field of view through the combiner 73.

In the HUD device 3 according to this embodiment and the helmet 101 equipped with the HUD device 3, the cover member 65 of the projection unit 39 is disposed from the surface of the chin portion 113 of the helmet body 105 to a location recessed from the outer surface of the liner 111 provided in the chin portion 113 in the chin portion 113 in the top-bottom direction in which the projection unit 39 projects display light. Thus, the user does not easily touch the cover member 65 with a hand in using the helmet 101 so that dirt on the hand of the user does not adhere to the surface of the cover member 65. Accordingly, blurring (bleeding) occurring in a display image displayed by the HUD device 3 can be reduced so that visual recognizability of the display image can be thereby enhanced.

In the HUD device 3 according to this embodiment and the helmet 101 equipped with the HUD device 3, the cover member 65 as a plate-shaped object is inclined to a direction in which the surface from which display light is emitted is oriented toward the outside of the helmet 101. Thus, as indicated by a chain line in FIG. 4, it is possible to prevent reflection of external light that has been applied to the inside of the helmet 101 and entered the optical path portion 119 on the surface of the cover member 65 toward the back surface of the shell 109 constituting the chin portion 113, and thereby, reflection of this external light toward an eye E of the user wearing the helmet 101 can be prevented. Accordingly, visual recognizability of a display image displayed by the HUD device 3 is not impaired and hindering of driving can be prevented.

In the HUD device 3 according to this embodiment and the helmet 101 equipped with the HUD device 3, the cover member 65 of the projection unit 39 is disposed at a distance from the optical path portion 119 in the helmet 101 with the gap 77 interposed between the cover member 65 and the optical path portion 119. Thus, as illustrated in FIG. 7, even when moisture 201 such as rainwater enters the optical path portion 119 through the upper end opening thereof while the shield 107 is lifted to open the window opening 103, the moisture 201 is released to the outside through the gap 77 between the cover member 65 of the projection unit 39 and the optical path portion 119.

As well as the moisture 201, foreign substances such as dust that has entered the optical path portion 119 from the upper end opening thereof can also be released to the outside through the gap 77 between the cover member 65 and the optical path portion 119. Accordingly, the moisture 201 and foreign substances that have entered the optical path portion 119 hardly accumulate on the surface of the cover member 65 of the projection unit 39, and even if the moisture 201 and foreign substances adhere to the surface of the cover member 65, the amount of adhesion can be reduced. As a result, blurring (bleeding) of a display image displayed by the HUD device 3 can be reduced so that visual recognizability of the display image can be thereby enhanced.

In addition, in the HUD device 3 according to this embodiment and the helmet 101 equipped with the HUD device 3, the hydrophilic coating film 71 is provided on the surface of the cover member 65. Thus, even when breath of the user wearing the helmet 101 reaches the surface of the cover member 65 through the optical path portion 119 and moisture included in the breath adheres to the surface of the cover member 65, moisture 301 is mixed in the surface of the cover member 65 as indicated by a chain double-dashed line in FIG. 6 so that minute liquid droplets are not easily formed on the surface of the cover member 65. This can reduce blurring of a display image displayed by the HUD device 3 so that visual recognizability of the display image can be thereby enhanced.

In the foregoing description, a preferred embodiment has been described as an example of the technique of the present disclosure. The technique disclosed here is, however, not limited to this embodiment, and is also applicable to other embodiments obtained by changes, replacements, additions, and/or omissions as necessary. Components provided in the accompanying drawings and the detailed description can include components unnecessary for solving problems. Therefore, it should not be concluded that such unnecessary components are necessary only because these unnecessary components are included in the accompanying drawings or the detailed description.

For example, the above embodiment may be configured as described below.

In the embodiment described above, the external light sensor 3a is disposed at the center in the left-right direction or near the center on the lower surface of the upper forehead portion 101a at the upper side in the top-bottom direction of a peripheral portion of the window opening 103 of the helmet body 105. The technique disclosed here is, however, not limited to this example. Examples of a position at which the external light sensor 3a can be provided in the helmet 101 equipped with the HUD device 3 are illustrated in the front views of the helmet 101 of FIGS. 13 and 14.

Figure 13:
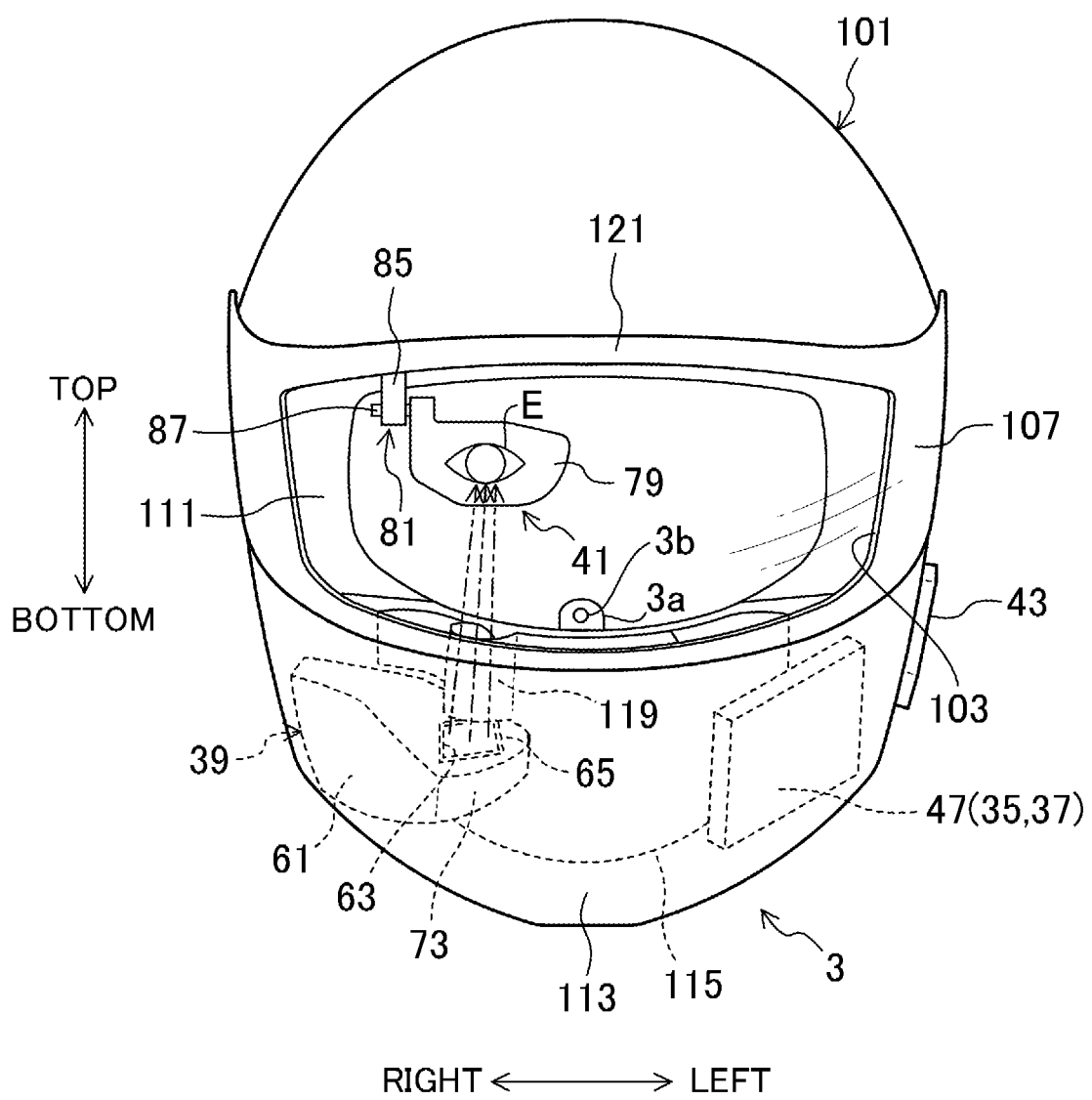
FIG. 13 is a front view of a helmet equipped with an HUD device according to a variation.
Figure 14:
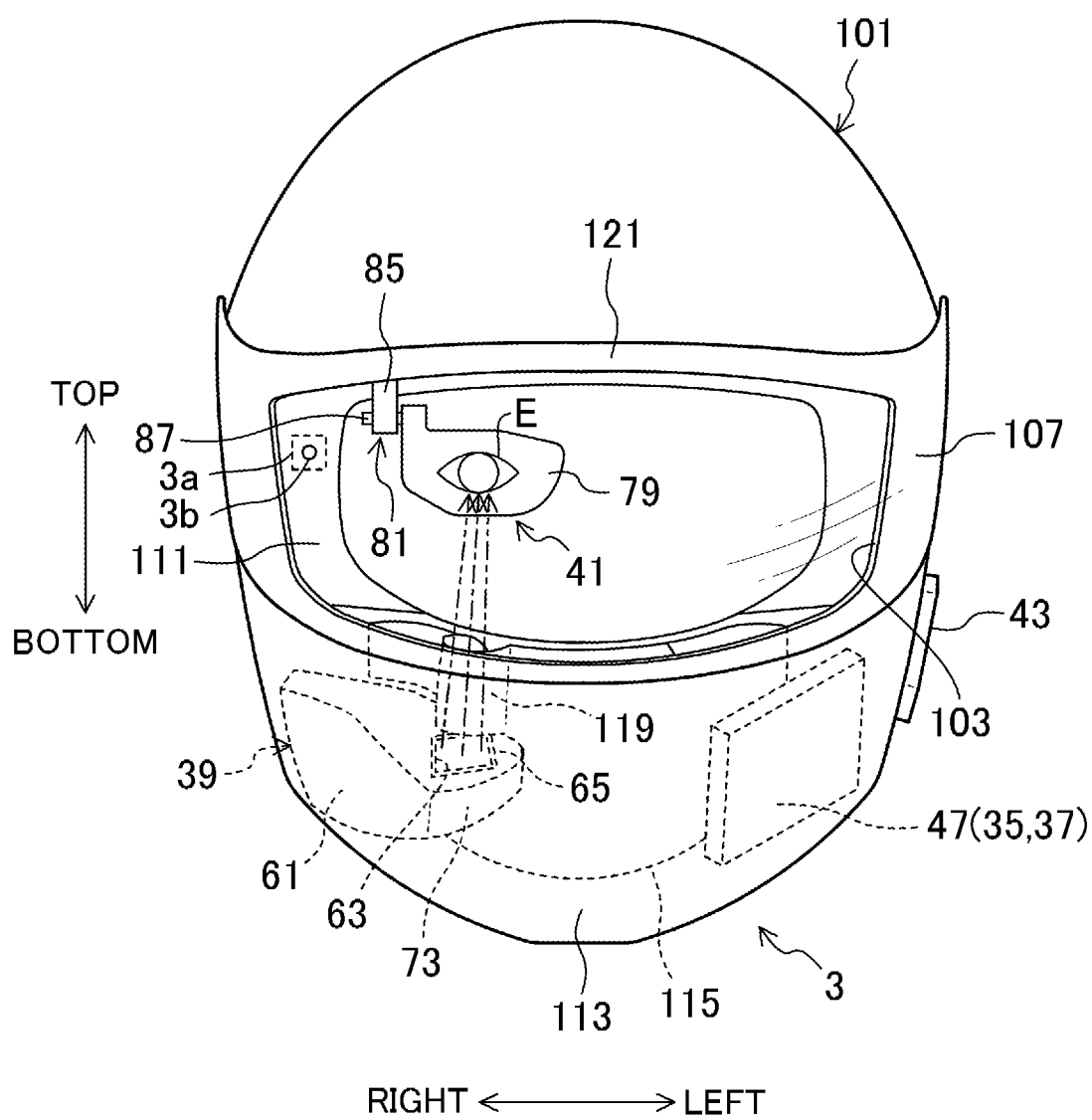
FIG. 14 is a front view of the helmet equipped with the HUD device according to the variation.
Figure 15:
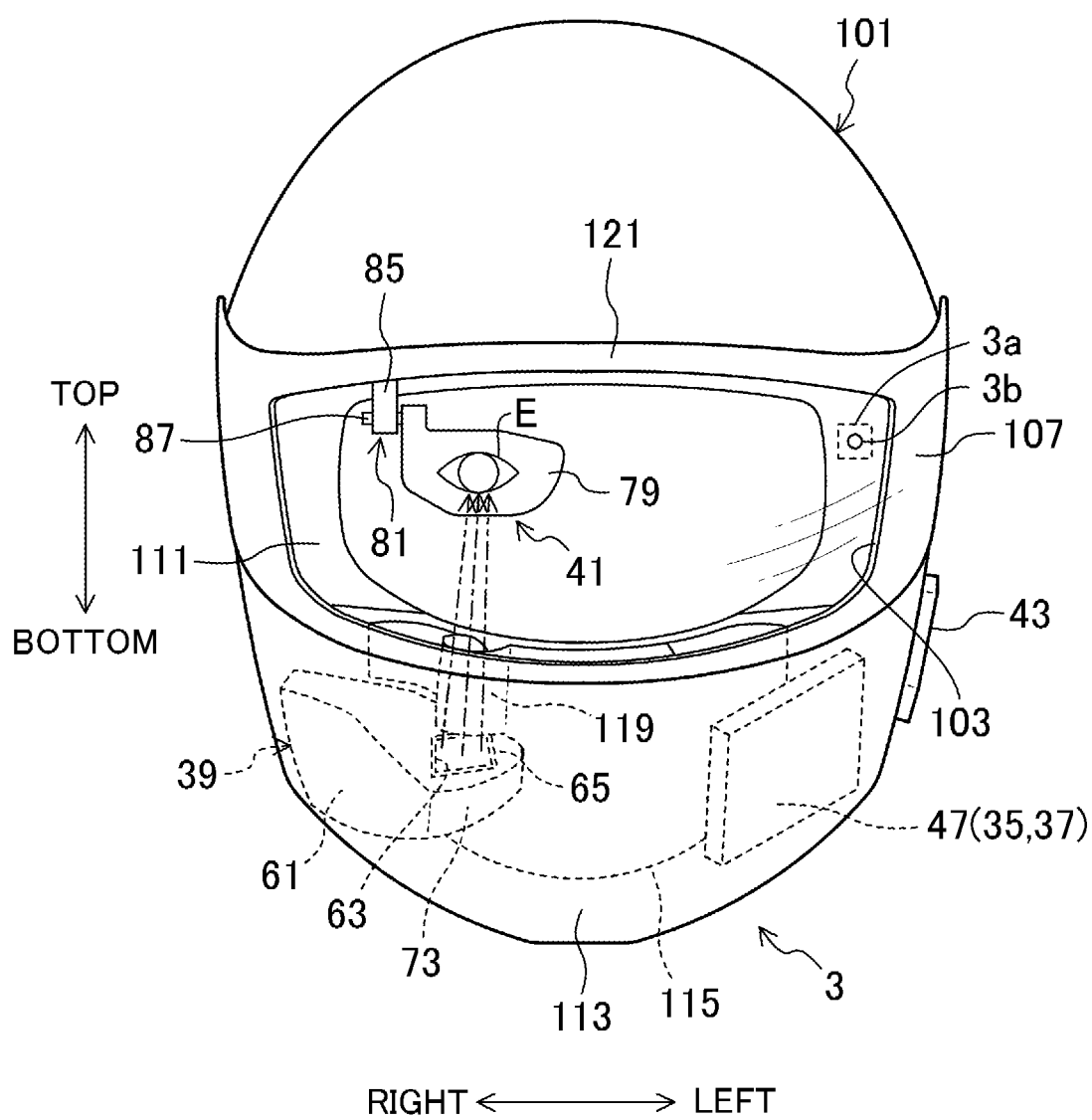
FIG. 15 is a front view of a helmet equipped with an HUD device according to a variation.

As illustrated in FIG. 13, the external light sensor 3a may be disposed at the center in the left-right direction or near the center on the upper surface of the chin portion 113 at the lower side in the top-bottom direction of a peripheral portion of the window opening 103 of the helmet body 105. Alternatively, as illustrated in FIG. 14, the external light sensor 3a may be disposed in an upper side in the top-bottom direction of a left side portion in the left-right direction of the peripheral portion of the window opening 103 of the helmet body 105. As illustrated in FIG. 15, the external light sensor 3a may be disposed in an upper side in the top-bottom direction of a right side portion in the left-right direction of the peripheral portion of the window opening 103 of the helmet body 105.

Figure 16:
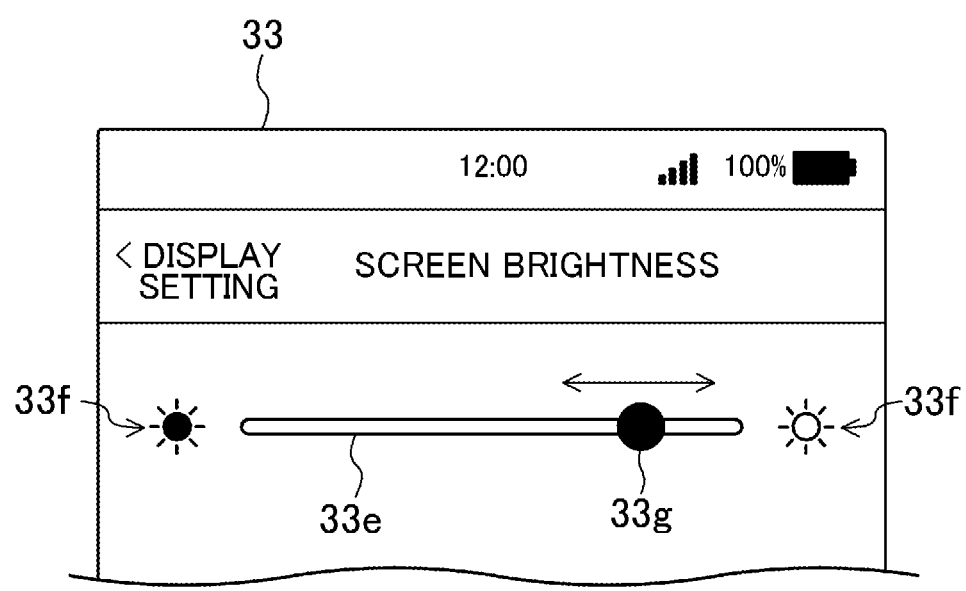
FIG. 16 is a view illustrating an example of a screen for setting brightness of HUD display on an information terminal according to a variation.

In the embodiment described above, the user selects one of the five brightness level options 33a listed on the setting screen 33 of the information terminal 5 to thereby set brightness of HUD display. The technique disclosed here is, however, not limited to this example. FIG. 16 illustrates an example of the screen 33 on which brightness of HUD display shown on the information terminal 5 is set.

The brightness of the HUD display may be continuously adjusted steplessly on the setting screen 33 displaying a brightness level bar 33e, icons 33f disposed at the left and right sides of the bar 33e and representing images, and a slider 33g enabling a sliding operation along the bar 33e, as illustrated in FIG. 16, for example. The user slides the slider 33g to the left or to the right by a touch operation to thereby adjust brightness of HUD display. The screen 33 for setting brightness of HUD display shown on the information terminal 5 can employ any other screens.

In the above embodiment, the configuration of the HUD device 3 in which display light is projected from the projection unit 39 to the combiner 79 provided as a projection target different from the shield 107 of the helmet 101 is described as an example. The technique disclosed here is, however, not limited to this example. As an alternative example, the HUD device 3 may use the shield 107 of the helmet 101 as a projection target instead of the combiner 79 and project display light from the projection unit 39 to the shield 107 so that a display image by display light is displayed as a virtual image while being superimposed on scenery in the forward field of view through the shield 107.

In the embodiment describe above, the gap 77 between the cover member 65 of the projection unit 39 and the optical path portion 119 is provided along the entire periphery of the lower end of the optical path portion 119. The technique disclosed here is, however, not limited to this example. The gap 77 may be provided only in a portion below the optical path portion 119, for example, in a portion ahead of the lower end of the lower end of the optical path portion 119.

In the embodiment describe above, a smartphone is used as an example of the information terminal 5 linked to the HUD device 3. The technique disclosed here is, however, not limited to this example. The information terminal 5 may be a terminal having functions similar to those of a smartphone such as a smartwatch, a tablet terminal, or a personal data assistant (PDA), or may be another portable information terminal as long as the terminal has the function of connecting to the external network N, includes the GPS receiver 7, and is capable of communicating with the HUD device 3. Instead of or in addition to the information terminal 5, the HUD device 3 may communicate with a motorcycle, receive detection information by various sensors mounted on the motorcycle, and provides a display image.

In the embodiment describe above, the reflection type display panel such as liquid crystal on silicon (LCOS) is described as an example display element used for the light emitter 57. The technique disclosed here is, however, not limited to this example. As the display element of the light emitter 57, a self-luminous display element such as an organic electro luminescence (EL) display panel or a vacuum fluorescent display (VFD) may be used.

In the embodiment describe above, the projection unit 39 includes the concave mirror 59. The technique disclosed here is, however, not limited to this example. The projection unit 39 may include a convex mirror a plane mirror, instead of the concave mirror 59.

In the embodiment describe above, information presented as a display image to the user by the HUD device 3 is information on a current time, a speed, and a route guide. The technique disclosed here is, however, not limited to this example. The information on the current time, the speed, and the route guide is merely an example of information that can be presented by the HUD device 3 and may be other information contributing to driving of a motorcycle. Other information useful for the user, such as information on peripheral facilities near a running region, may be used as items displayed by the HUD device 3 by, for example, setting with the link app 31 of the information terminal 5.

In the embodiment describe above, the full face helmet has been described as an example of the helmet 101 equipped with the HUD device 3. The technique disclosed here is, however, not limited to this example. The full face helmet 101 is merely an example of the helmet 101 equipped with the HUD device 3, and any type of a helmet, such as an open-face (jet) helmet or a semi-jet (three quarter) helmet, as long as the helmet includes a portion capable of incorporating a projection unit.

In the embodiment describe above, the helmet 101 worn in driving of a motorcycle is described as an example of the helmet 101 equipped with the HUD device 3. The technique disclosed here is, however, not limited to this example. The HUD device 3 is, of course, applicable to helmets used for two-wheeled vehicles including personal watercrafts and bicycles and other vehicles such as snowmobiles (snow bikes).

Figure 8:
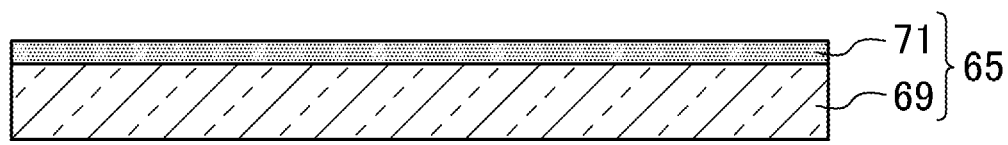
FIG. 8 is a cross-sectional view of a cover member according to a first variation.
Figure 9:
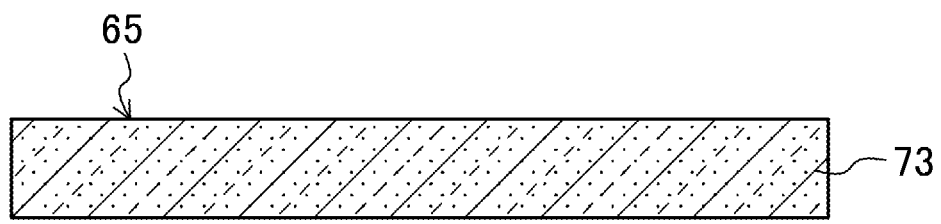
FIG. 9 is a cross-sectional view of a cover member according to a second variation.

As described in a first variation illustrated in FIG. 8, the cover plate 65 is configured by attaching a smoke film 71 as a translucent dark-colored resin film to the surface of the colorless transparent base material 69. Each of the base material 69 and the smoke film 71 is made of, for example, a polycarbonate (PC) or polymethyl methacrylate (PMMA) resin. The smoke film 71 is made of a dark-colored material. As described in a second variation illustrated in FIG. 9, the cover plate 65 may be constituted by a single resin plate 73 made of a dark-colored material. Since the cover plate 65 has a smoke color described above, a dimming effect of making a light transmittance in the thickness direction lower than a light transmittance in the case of using a colorless transparent material.

The light transmittance of the cover plate 65 in the thickness direction is greater than or equal to 5% and less than or equal to 50%. The light transmittance of the cover plate 65 is a value of a total light transmittance measured in conformity with JIS K 7361-1 (or JIS K 7375:2008), and can be measured with, for example, a measurement device produced by MURAKAMI COLOR RESEARCH LABORATORY (high-speed integrating sphere type spectrophotometric transmittance meter: DOT-41).

The light transmittance of the cover plate 65 is set in the above-described range for the following reasons: If the light transmittance of the cover plate 65 in the thickness direction is less than 5%, the amount of electricity of a power supply consumed by the light emitter 57 to adjust a display image displayed by the HUD device 3 to brightness with which the user easily visually recognizes the display image increases. If the light transmittance of the cover plate 65 in the thickness direction exceeds 50%, visual recognizability of a display image displayed by the HUD device 3 might be impaired because light that has once passed through the cover plate 65 to be reflected inside the projection unit 39 to a direction in which the light passes through the cover plate 65 again is projected in the combiner.

As described above, the technique disclosed here is useful for an HUD device mounted on a helmet and a helmet on which equipped with an HUD device.

What is claimed is:

1. A head-up display device configured to be mounted on a helmet, the helmet including an exterior member and an interior member, the head-up display device comprising:
  a projection unit configured to project display light to a projection target, the display light being used for forming a display image capable of being visually recognized as a virtual image by a user wearing the helmet through the projection target, the projection target being disposed in front of an eye of the user and having both light transmittance and light reflection; and a combiner unit for causing the display image by the display light projected from the projection unit to be visually recognized as the virtual image by the user, wherein the combiner unit includes a combiner and a support mechanism that supports the combiner in a position in front of the eye of the user wearing the helmet, the support mechanism includes a stay extending in a top-bottom direction, the stay having an upper portion retained by a holder incorporated in a forehead portion of a helmet body, the stay having a lower end coupled to the combiner through a rotation shaft extending in a left-right direction, the projection unit includes a light emitter configured to emit display light, a housing having an opening through which display light emitted from the light emitter passes, and a cover member having transparency to light and disposed to cover the opening of the housing, the projection unit is incorporated in the helmet such that display light to be projected to the projection target through the cover member passes through a cylindrical optical path portion provided in the interior member, the cover member is disposed at an inner side of the interior member than a surface of the interior member at which an end of the optical path portion at a light emission side is open, and in the projection unit, a projection portion in which the opening of the housing is covered with the cover member is located inside a chin portion of the helmet body and outside a mouth cover.

2. The head-up display device according to claim 1, wherein
the cover member is a plate-shaped object, and inclined in a direction in which a surface of the cover member from which display light is emitted faces outside of the helmet.

3. The head-up display device according to claim 1, wherein
the housing is oriented with the opening facing upward, and
the optical path portion is disposed above the cover member at a distance and extends in the top-bottom direction.

4. The head-up display device according to claim 3, wherein
the cover member has a surface provided with a hydrophilic coating film.

5. A helmet including an exterior member and an interior member and provided with a head-up display device, wherein
the head-up display device includes: a projection unit configured to project display light to a projection target, the display light being used for forming a display image capable of being visually recognized as a virtual image by a user wearing the helmet through the projection target, the projection target being disposed in front of an eye of the user and having both light transmittance and light reflection; and a combiner unit for causing the display image by the display light projected from the projection unit to be visually recognized as the virtual image by the user, the combiner unit includes a combiner and a support mechanism that supports the combiner in a position in front of the eye of the user wearing the helmet, the support mechanism includes a stay extending in a top-bottom direction, the stay having an upper portion retained by a holder incorporated in a forehead portion of a helmet body, the stay having a lower end coupled to the combiner through a rotation shaft extending in a left-right direction, the projection unit includes a light emitter configured to emit display light, a housing having an opening through which display light emitted from the light emitter passes, and a cover member having transparency to light and disposed to cover the opening of the housing, a cylindrical optical path portion is provided at a side of the housing having the opening, the projection unit is incorporated in the helmet such that display light to be projected to the projection target through the cover member passes through the cylindrical optical path portion provided in the interior member, the cover member is disposed at an inner side of the interior member than a surface of the interior member at which an end of the optical path portion at a light emission side is open, and in the projection unit, a projection portion in which the opening of the housing is covered with the cover member is located inside a chin portion of the helmet body and outside a mouth cover.

6. A head-up display device configured to be mounted on a helmet, the head-up display device comprising
a projection unit configured to project display light to a projection target, the display light being used for forming a display image capable of being visually recognized as a virtual image by a user wearing the helmet through the projection target, the projection target being disposed in front of an eye of the user and having both light transmittance and light reflection, wherein
the projection unit includes a light emitter configured to emit display light, a housing having an opening through which display light emitted from the light emitter passes, and a cover plate having transparency to light and disposed to cover the opening of the housing, and
the cover plate has a color with which a dimming effect of making a light transmittance in a thickness direction lower than a light transmittance of a colorless transparent cover plate is obtained.

7. The head-up display device according to claim 6, wherein
the color of the cover plate with which the dimming effect is obtained is a smoke color.

8. The head-up display device according to claim 6, wherein
the light transmittance of the cover plate in the thickness direction is less than or equal to 50%.

9. A helmet equipped with a head-up display device, wherein
the head-up display device includes a projection unit configured to project display light to a projection target, the display light being used for forming a display image capable of being visually recognized as a virtual image by a user wearing the helmet through the projection target, the projection target being disposed in front of an eye of the user and having both light transmittance and light reflection,
the projection unit includes a light emitter configured to emit display light, a housing having an opening through which display light emitted from the light emitter passes, and a cover plate having transparency to light and disposed to cover the opening of the housing, and
the cover plate has a color with which a dimming effect of making a light transmittance in a thickness direction lower than a light transmittance of a colorless transparent cover plate is obtained.

10. A head-up display device configured to be mounted on a helmet, the helmet including a helmet body having a window opening for providing a field of view to a user wearing the helmet, and a transparent shield configured to be exchangeably attached to the helmet body and to cover at least a portion of the window opening, the head-up display device comprising:
  a combiner disposed inside the shield;
  a light emitter configured to emit display light to be projected to the combiner; and
  a control unit configured to control generation of display light in the light emitter, wherein the control unit is linked to an operator, the operator being configured to receive an operation for adjusting brightness of a display image capable of being visually recognized as a virtual image by the user wearing the helmet through the combiner by projection of display light to the combiner, the control unit being configured to cause the light emitter to generate display light such that the display image has brightness adjusted by an operation of the operator.

11. A helmet equipped with a head-up display device, the helmet comprising:
  a helmet body having a window opening for providing a field of view to a user wearing the helmet; and
  a transparent shield configured to be exchangeably attached to the helmet body and to cover at least a portion of the window opening, wherein
  the head-up display device is configured to show visual information to the user wearing the helmet,
  the head-up display device includes a combiner disposed inside the shield, a light emitter configured to emit display light to be projected to the combiner, and a control unit configured to control generation of display light in the light emitter, and
  the control unit is linked to an operator, the operator being configured to receive an operation for adjusting brightness of a display image capable of being visually recognized as a virtual image by the user wearing the helmet through the combiner by projection of display light to the combiner, the control unit being configured to cause the light emitter to generate display light such that the display image has brightness adjusted by an operation of the operator.

* * * * *